(12) United States Patent
Matecki et al.

(10) Patent No.: US 9,884,597 B2
(45) Date of Patent: *Feb. 6, 2018

(54) MULTI-STRIP BEAM-FORMING APPARATUS, METHOD, AND BEAM

(71) Applicant: Shape Corp., Grand Haven, MI (US)

(72) Inventors: Joseph R. Matecki, Allendale, MI (US); Jonathon J. Pothoven, Coopersville, MI (US)

(73) Assignee: Shape Corp., Grand Haven, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/173,797

(22) Filed: Jun. 6, 2016

(65) Prior Publication Data

US 2016/0280163 A1    Sep. 29, 2016

Related U.S. Application Data

(63) Continuation-in-part of application No. 14/692,327, filed on Apr. 21, 2015, now Pat. No. 9,381,880.

(Continued)

(51) Int. Cl.
*B60R 19/18* (2006.01)
*B60R 19/04* (2006.01)
(Continued)

(52) U.S. Cl.
CPC .............. *B60R 19/023* (2013.01); *B23K 9/02* (2013.01); *B60R 19/04* (2013.01); *B60R 19/18* (2013.01);
(Continued)

(58) Field of Classification Search
CPC ....... B60R 19/023; B60R 19/18; B60R 19/04; B60R 19/2019–19/1806; B60R 19/1813;
(Continued)

(56) References Cited

U.S. PATENT DOCUMENTS

| 1,927,442 A | 9/1933 | Laufle |
| 4,397,490 A * | 8/1983 | Evans ................... B60R 19/02 |
| | | 293/120 |

(Continued)

FOREIGN PATENT DOCUMENTS

| CA | 2349628 | 10/2004 |
| JP | 201019414 | 1/2010 |
| RU | 2077998 C1 | 4/1997 |

OTHER PUBLICATIONS

International Search Report and Written Opinion of the International Searching Authority dated Jul. 9, 2015 (International Application PCT/US2015/027734) 9 pages.

*Primary Examiner* — Gregory Blankenship
(74) *Attorney, Agent, or Firm* — Price Heneveld LLP

(57) ABSTRACT

A bumper reinforcement beam includes sheets pre-formed to have integral features and to have a final beam shape with non-radiused corners and optimal impact properties, including beams with constant or varied cross-sectional shapes, and beams made of steel, aluminum, or hybrid materials or combinations of material, all of which allow minimization of weight. The non-radiused corners offer excellent impact strength and properties. Beam impact properties can be improved or locally tuned for particular functional requirements by material selection, or by adding an internal reinforcement on an inside center of the front wall, or by localized annealing of the welds to minimize stress risers, or by localized features and shapes. The sheets can be welded using welding processes that provide low heat-affected-zones around the weld or by localized annealing, thus minimizing any adverse effect of welding.

15 Claims, 24 Drawing Sheets

Related U.S. Application Data

(60) Provisional application No. 62/089,334, filed on Dec. 9, 2014, provisional application No. 62/024,751, filed on Jul. 15, 2014, provisional application No. 61/985,029, filed on Apr. 28, 2014.

(51) Int. Cl.
  *B60R 19/02* (2006.01)
  *B23K 9/02* (2006.01)
  *E04C 3/06* (2006.01)
  *E04C 3/04* (2006.01)
  *B23K 101/00* (2006.01)

(52) U.S. Cl.
  CPC .......... *E04C 3/06* (2013.01); *B23K 2201/006* (2013.01); *B60R 2019/182* (2013.01); *B60R 2019/1826* (2013.01); *E04C 2003/043* (2013.01); *E04C 2003/0413* (2013.01); *E04C 2003/0439* (2013.01); *E04C 2003/0465* (2013.01)

(58) Field of Classification Search
  CPC . B60R 19/182; E04C 3/04; E04C 2003/0413; E04C 2003/043; E04C 2003/0452; E04C 2003/0465
  USPC ........................................................ 293/102
  See application file for complete search history.

(56) References Cited

U.S. PATENT DOCUMENTS

| | | | |
|---|---|---|---|
| 4,457,547 A * | 7/1984 | Sekiyama | B60R 19/18 293/110 |
| 6,209,934 B1 | 4/2001 | Sakuma et al. | |
| 6,325,431 B1 * | 12/2001 | Ito | B60R 19/18 293/102 |
| 6,428,064 B1 * | 8/2002 | Frederick | B60N 2/4626 293/120 |
| 6,439,650 B2 * | 8/2002 | Artner | B62D 21/152 293/102 |
| 6,481,690 B2 | 11/2002 | Kariatsumari et al. | |
| 6,808,215 B2 * | 10/2004 | Sakuma | B60R 19/34 293/102 |
| 6,971,691 B1 | 12/2005 | Heatherington et al. | |
| 7,837,224 B2 * | 11/2010 | Benkler | B60R 13/0225 280/730.2 |
| 7,837,244 B2 | 11/2010 | Hashimura | |
| 8,469,415 B2 | 6/2013 | Haneda et al. | |
| 8,708,380 B2 * | 4/2014 | Tsuchida | B60R 19/18 293/102 |
| 8,820,453 B2 | 9/2014 | Giles-Brown et al. | |
| 8,864,198 B2 | 10/2014 | Kim | |
| 8,939,479 B2 | 1/2015 | Ashiya et al. | |
| 8,950,793 B2 | 2/2015 | Deighton | |
| 9,180,760 B2 | 11/2015 | Schleichert et al. | |
| 9,327,592 B2 * | 5/2016 | Wankhede | B60K 11/04 |
| 9,352,710 B2 * | 5/2016 | Ishitobi | B60R 19/18 |
| 9,381,880 B2 * | 7/2016 | Matecki | B60R 19/023 |
| 2001/0017473 A1 * | 8/2001 | Yamamoto | B60R 19/18 293/102 |
| 2002/0053805 A1 | 5/2002 | Azuchi et al. | |
| 2004/0130167 A1 | 7/2004 | Mori et al. | |
| 2004/0135382 A1 | 7/2004 | Sakuma et al. | |
| 2005/0225101 A1 | 10/2005 | Bladow et al. | |
| 2007/0120383 A1 | 5/2007 | Schmidt et al. | |
| 2011/0204663 A1 | 8/2011 | Baccouche et al. | |
| 2012/0043772 A1 * | 2/2012 | Kinefuchi | B60R 19/03 293/102 |
| 2013/0119680 A1 | 5/2013 | Kosaka et al. | |
| 2013/0175813 A1 | 7/2013 | Mana et al. | |
| 2014/0070552 A1 | 3/2014 | Shimotsu | |
| 2015/0307045 A1 | 10/2015 | Matecki et al. | |
| 2016/0059340 A1 * | 3/2016 | Hill | B23K 35/28 428/596 |
| 2016/0144812 A1 * | 5/2016 | Kaneko | B60R 19/18 293/102 |
| 2016/0159300 A1 * | 6/2016 | Matecki | B23P 15/00 293/120 |

\* cited by examiner

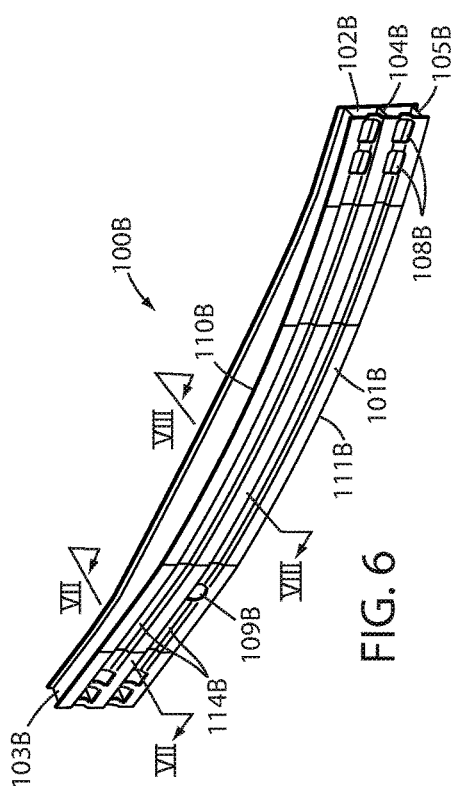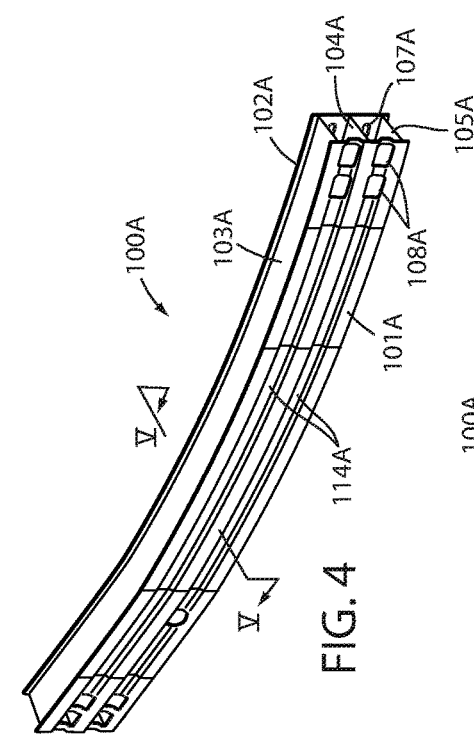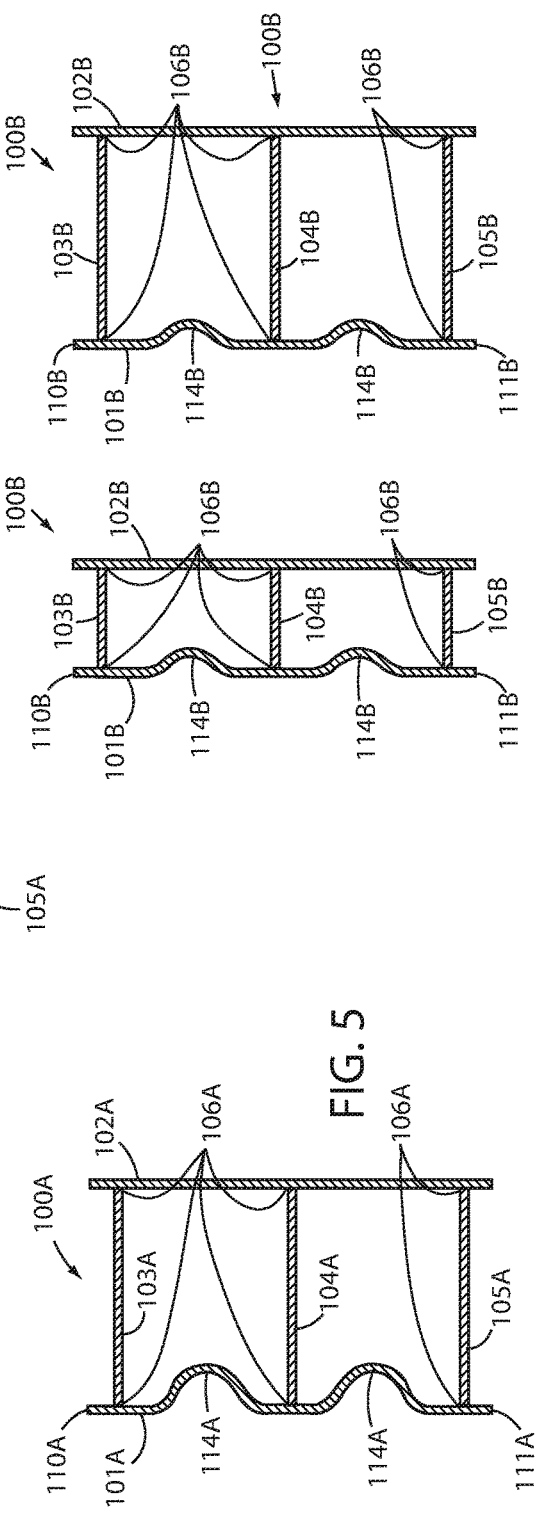

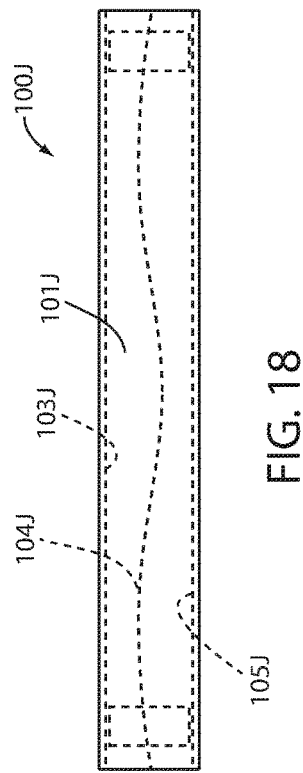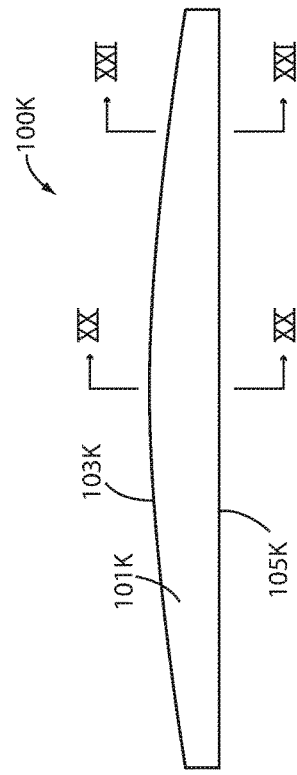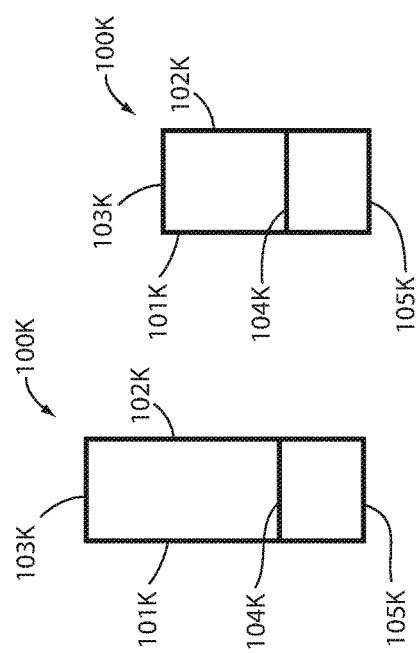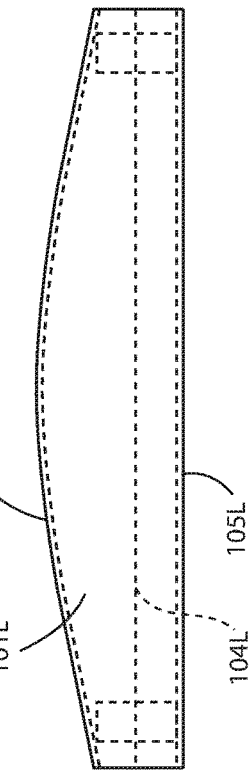

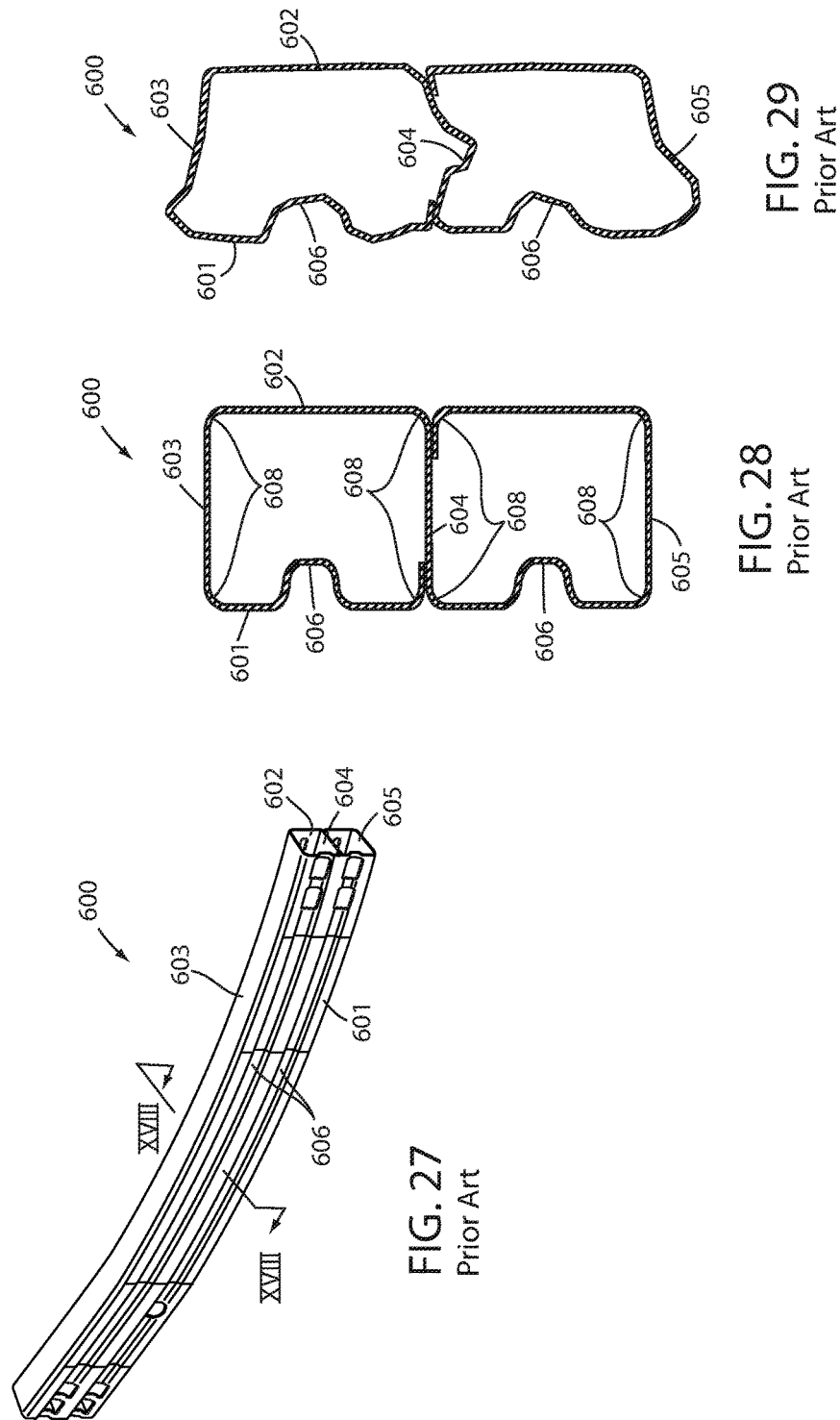

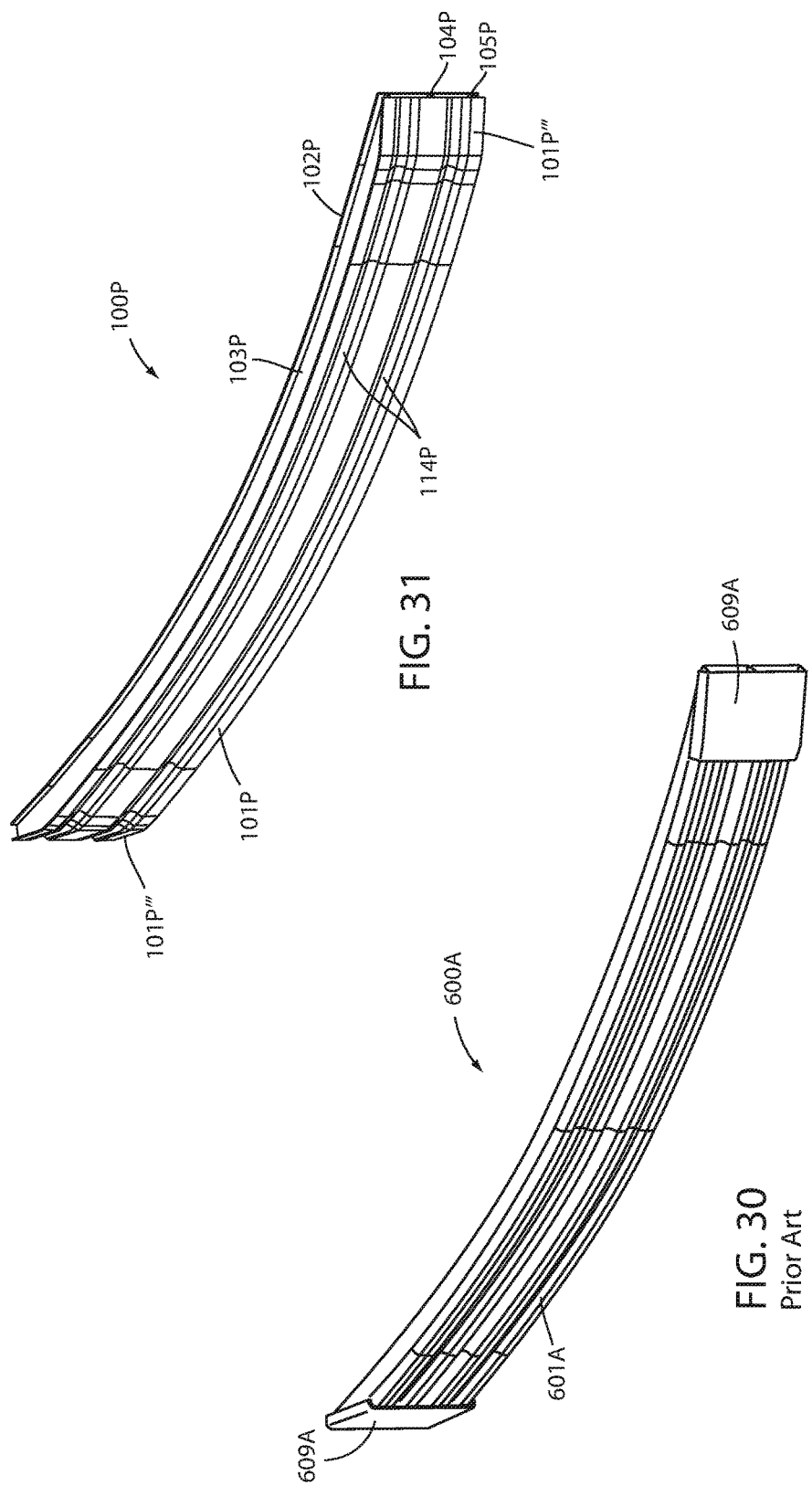

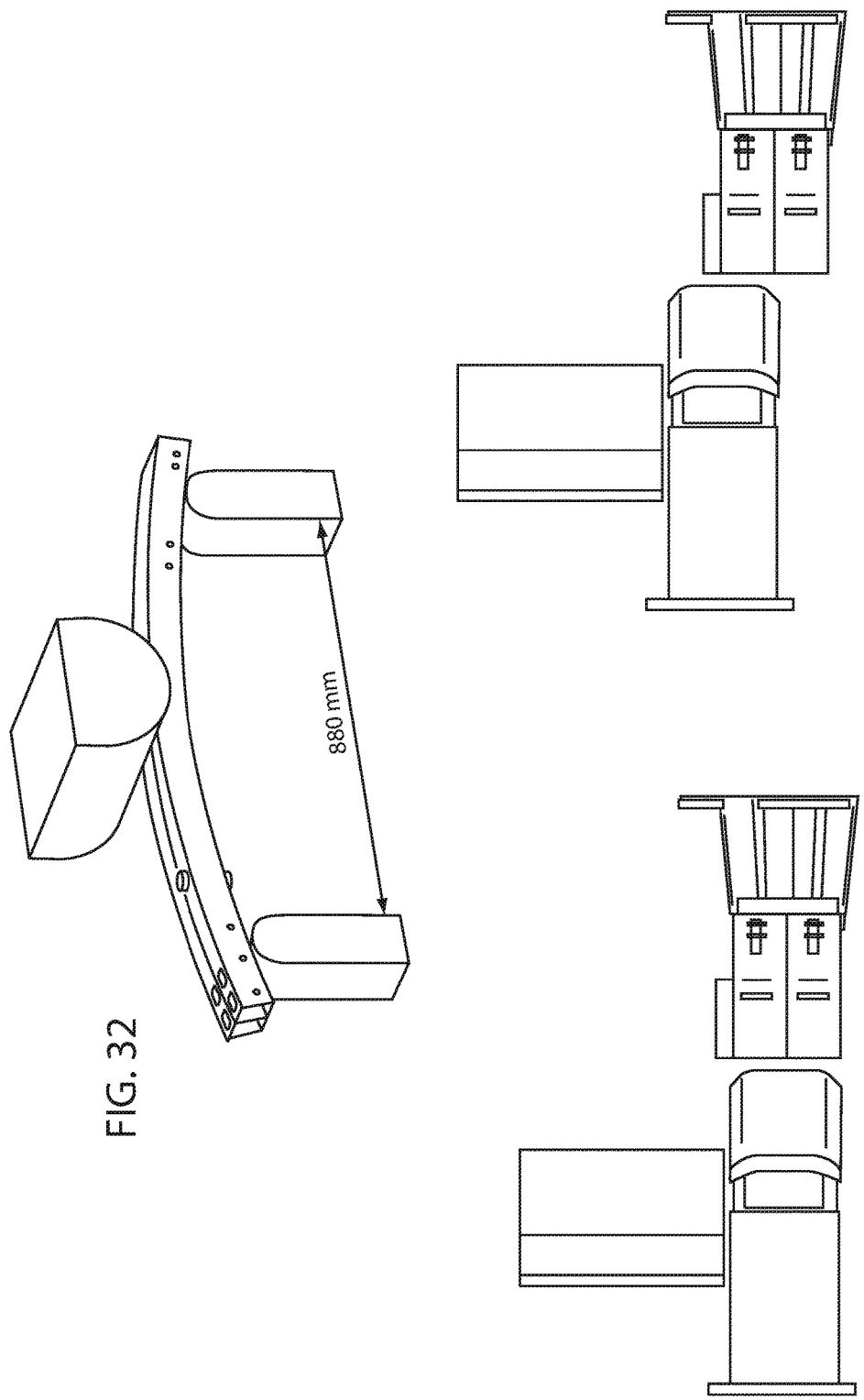

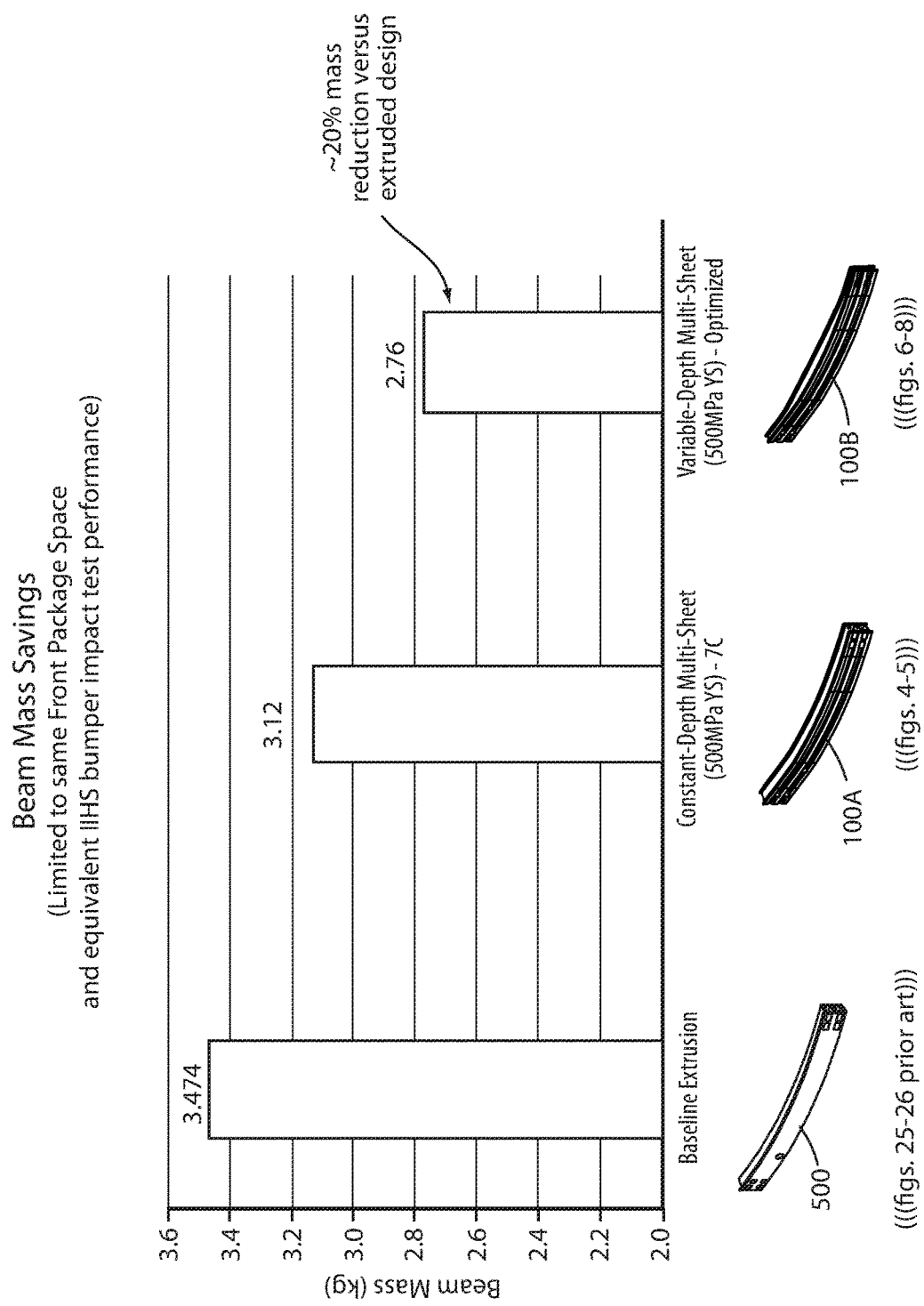

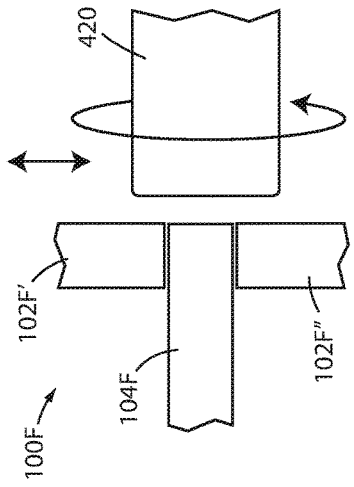
FIG. 46
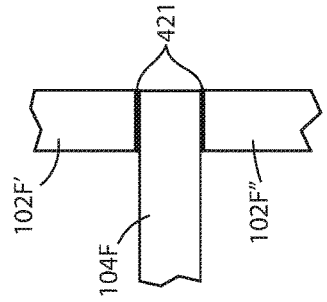
FIG. 47
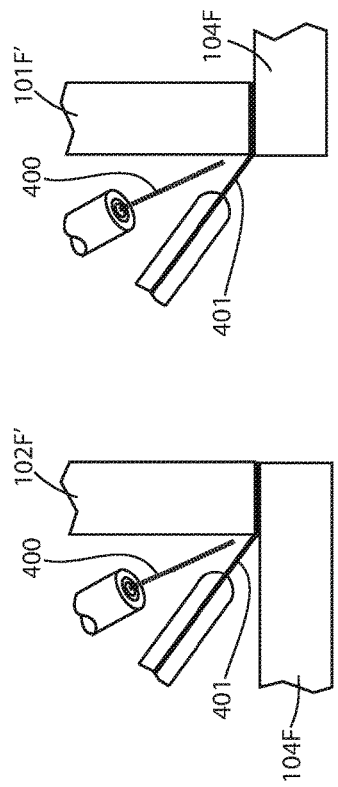
FIG. 44
FIG. 43
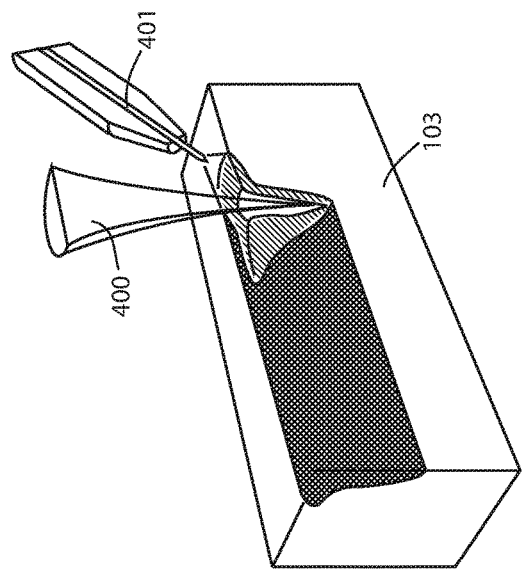
FIG. 45

US 9,884,597 B2

1

MULTI-STRIP BEAM-FORMING APPARATUS, METHOD, AND BEAM

CROSS-REFERENCE TO RELATED APPLICATIONS

This application is a continuation-in-part of U.S. patent application Ser. No. 14/692,327, filed on Apr. 21, 2015, entitled MULTI-STRIP BEAM-FORMING APPARATUS, METHOD AND BEAM, issued as U.S. Pat. No. 9,381,880, which claims the benefit of U.S. Provisional Application Ser. No. 62/089,334 entitled MULTI-STRIP BEAM-FORMING APPARATUS, METHOD, AND BEAM, filed Dec. 9, 2014, and U.S. Patent Application Ser. No. 62/024,751 entitled MULTI-STRIP BEAM WITH VARIED CROSS SECTION, filed Jul. 15, 2014, and U.S. patent application Ser. No. 61/985,029 entitled MULTI-STRIP BEAM-FORMING APPARATUS, METHOD, AND BEAM, filed Apr. 28, 2014, the entire contents of which are incorporated herein by reference.

BACKGROUND OF THE INVENTION

The present invention relates to beam-forming apparatus and methods, and elongated beams manufactured using same, and more particularly relates to multi-strip beams and related apparatus and methods for forming automotive bumper reinforcement beams from multiple strips. However, a scope of the present invention is not limited to bumper reinforcement beams nor automotive uses.

Modern vehicles include bumper systems with reinforcement beams that must pass stringent performance requirements (e.g. test standards that measure torsional and bending impact strengths, various barrier impacts, vehicle to vehicle and pedestrian impacts), but also meet industry standards that place a premium on minimizing weight (e.g. mpg standards). Also, the competitiveness of the industry requires minimizing manufacturing cost while providing high dimensional consistency, reliability of manufacture, and design and manufacturing flexibility.

Bumper reinforcement beams are used to provide cross car structure to bumper systems, and are often made by roll forming and/or extrusion processes. Roll forming can provide a competitive process cost with good part quality when used in high volume runs. However, most high-volume commercial roll forming processes are limited to constant cross-sectional shapes, are limited to forming a single sheet of material, require significant lead time to develop the forming rolls, and require substantial investment in heavy-duty roll forming equipment. Secondary processes have been used to reshape portions of roll formed beams, but secondary processes are expensive, slow, often not dimensionally consistent, require multiple handling of in-process parts, and can be manually intensive.

Extruded aluminum beams are sometimes specified by original equipment manufacturers (called OEMs) due to their light weight, high strength-to-weight ratio, and the ability of extruded aluminum beams to have walls with different thicknesses located for optimal performance. However, aluminum is an expensive material, and further extrudable grades of aluminum are limited in tensile strength and are generally high in cost. Also, aluminum beams have constant cross sections along their full length, due to the extruding process. Also, beams made using extrusion processes require secondary operations, such as beam-curving (i.e. "sweeping"), hole-punching (e.g. for bracket attachment or for attachment holes or clearance holes), and aging/thermal-treatment of the material (for strength and stability).

An improvement is desired that provides flexibility of part design (including use of optimally-placed wall materials, varied wall thicknesses and shapes), but that also provides process savings/improvements in terms of low cost, relatively lower capital investment, high efficiency of manufacture, good reliability, high dimensional consistency, and low in-process inventory. It is desirable to use forming and bonding processes that are known and non-exotic.

SUMMARY OF THE INVENTION

In one aspect of the present invention, a reinforcement beam article comprises a plurality of at least three separate pre-formed sheets secured together with weld material to form a tubular box beam with front and rear vertical walls and multiple horizontal walls defining upper and lower tubes, an edge of some of the sheets abutting a side surface of an adjacent one of the sheets to define front and rear non-radiused corners when cross sectioned transversely to a length of the beam.

In another aspect of the present invention, a reinforcement beam article comprises a plurality of at least three separate sheets secured together with weld material to form a tubular box beam with front and rear vertical walls and multiple horizontal walls defining at least one tube, an edge of some of the sheets abutting a side surface of an adjacent one of the sheets to define front and rear non-radiused corners when cross sectioned transversely to a length of the beam, and an internal reinforcement attached to an inside center portion of the front wall, the internal reinforcement not extending to ends of the beam.

In another aspect of the present invention, a reinforcement beam article comprises a plurality of at least three separate sheets secured together with weld material to form a tubular box beam with front and rear vertical walls and multiple horizontal walls defining at least one tube, an edge of some of the sheets abutting a side surface of an adjacent one of the sheets to define front and rear non-radiused corners when cross sectioned transversely to a length of the beam, at least one localized region of the weld material being annealed to reduce stress near a predetermined welded area and to make the hardness more uniform across the welded area, but the localized region being limited to less than a full circumference of a cross section through the beam and limited to less than a full length of the beam.

In yet another aspect of the present invention, a method of manufacturing a reinforcement beam comprises fixturing a plurality of at least three separate pre-formed sheets and then securing the sheets together with weld material (using material of the sheets or separately added weld material) to form a tubular box beam with front and rear vertical walls and multiple horizontal walls defining upper and lower tubes, an edge of some of the sheets abutting a side surface of an adjacent one of the sheets to define front and rear non-radiused corners when cross sectioned transversely to a length of the beam.

These and other aspects, objects, and features of the present invention will be understood and appreciated by those skilled in the art upon studying the following specification, claims, and appended drawings.

BRIEF DESCRIPTION OF THE DRAWINGS

FIGS. 4-5 are perspective and cross-sectional views of a beam similar to FIG. 2, but with channel ribs in its front wall.

FIGS. 6-8 are perspective and cross-sectional views of a beam similar to FIG. 4, but with channel ribs and a varied cross section along its length.

FIG. 18 is a front view of a multi-sheet beam where the front wall has a constant height and the top and bottom horizontal shear walls extend in having planes rearward from upper and lower edges of the front wall, but where the intermediate horizontal shear wall has an undulating non-planar shape (shown in dashed lines).

FIGS. 19-21 are front, and cross-sectional views of a double-tube beam where one tube has a varied shape along a length of the beam.

FIG. 22 is a front view of a multi-sheet beam where the front wall has an arching upper edge that extends vertically well above a top of ends of the beam.

FIGS. 27-28 are perspective and cross-sectional views of a prior art roll formed steel beam with double tube design and radiused corners.

FIG. 29 is a view similar to FIG. 28 but after initial impact where radiused corners are beginning to collapse.

FIG. 30 is a perspective view of a prior art, reinforcement beam with a cross section profile matching the beam in FIG. 28 (which is roll formed from a single steel sheet), the beam having end caps welded onto angle-cut ends to define outboard ends of the front wall.

FIG. 31 is a perspective view of a beam dimensionally similar to FIG. 30, but where the outboard ends are formed by pre-forming the outboard ends of the front wall and shear walls (instead of using secondary cutting and welding operations).

FIGS. 32-34 are prior art beam tests, FIG. 32 showing a three-point bending test, FIG. 33 showing a zero offset centerline bumper impact test (also called an "IIHS 100% overlap impact test"), and FIG. 34 showing a 73.2 mm offset centerline overlap impact test.

FIGS. 35-36 are charts comparing mass savings of a multi-sheet aluminum beam (see FIGS. 4 and 6) over an extruded aluminum beam (see FIG. 25), FIG. 35 comparing mass for beams fitting into a same package space and equivalent IIHS bumper impact test performance;

FIG. 36 comparing beam mass for beams fitting into a same package space and having similar bending test results.

FIG. 38 comparing mass savings for beams fitting into a same package space and having an equivalent IIHS 100% overlap impact test performance; and FIG. 39 comparing mass savings for beams fitting into a same package space and having an equivalent IIHS 73.2 mm offset overlap impact test performance.

FIGS. 43-44 are 1$^{st}$ and 2$^{nd}$ side views, and FIG. 45 is a perspective view, of a cold metal transfer (CMT) welding process using a laser beam to weld a cold wire fed into the weld area, the CMT welding process minimizing the heat-affected-zone around the weld to less than about 3 mm, and potentially less than about 1.5 mm.

FIGS. 46-47 are side views of a friction stir welding (FSW) process using a spinning/moving tool that causes solid state welding, the FSW process eliminating or nearly eliminating the heat-affect-zone around the weld.

FIG. 58 showing hardness variations in the beam's (vertical) front wall across the weld, and FIG. 59 showing similar hardness variations in the shear wall abutting the front wall, where annealing can reduce a size of the hardness variations by 50% or more, depending on the time period and temperature of the annealing process and depending on materials of the beam.

DETAILED DESCRIPTION OF PREFERRED EMBODIMENT

It should be understood that many of the present innovative concepts are inter-related, and can be combined in different ways to generate a wide variety of different beam designs. Concurrently, persons skilled in the art will understand that it is not possible to illustrate every single possible beam that could be constructed using these principles. Accordingly, skilled artisans will understand that the wide variety of beams can be constructed using characteristics selected from any of the various illustrated embodiments. Thus, the present illustrations are not intended to be exhaustive, nor limiting.

In the following figures, multi-sheet beams (also called "multi-strip beams" or "bumper reinforcement beams" or "beam segments") are described as made from high strength material (aluminum or steel sheets) welded together. The beams typically have optimally-placed wall thicknesses and properties at strategic locations to give them excellent impact strengths while minimizing weight as needed for specific vehicle applications. Novel welding processes are also discussed for forming low heat-affect-zones around the welded area of beams, particularly around the non-radiused perpendicular corners formed by abutting adjacent sheets, and a related novel fixturing system is described for holding the sheets together during welding. As used herein, the term "non-radiused corner" (or "zero radiused corner") is used to mean a corner formed by an edge of a first sheet abutting a non-edge (body) of a second sheet, where the abutting structure at the corner defines an angle of about 90 degrees (e.g. within 5-10 degrees of perpendicular), and where the abutting structure at the corner does not include a radius formed by sheet material that would "roll" or become unstable during a side impact into the beam at the corner.

Figure 2:
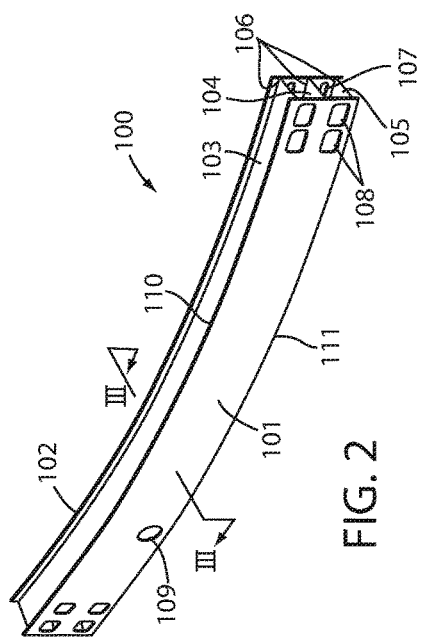
FIGS. 1-3 are exploded perspective, assembled perspective, and cross-sectional views of a beam made of five aluminum sheets, two forming front and rear walls, and three forming horizontal shear walls, the front and rear walls having frame-attachment holes and having up flanges and down flanges extending above and below the shear walls, all corners of the beam being non-radiused perpendicular corners.
Figure 3:
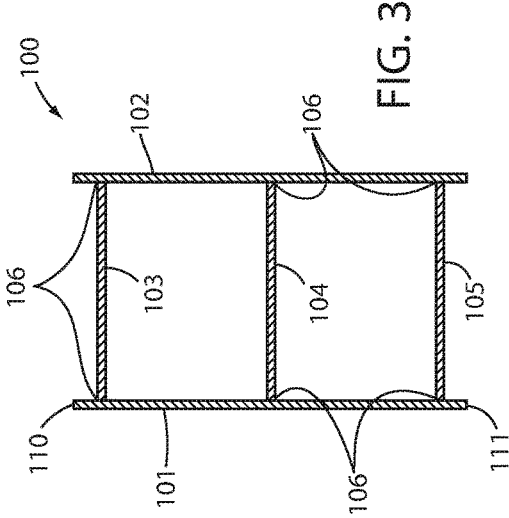
Figure 1:
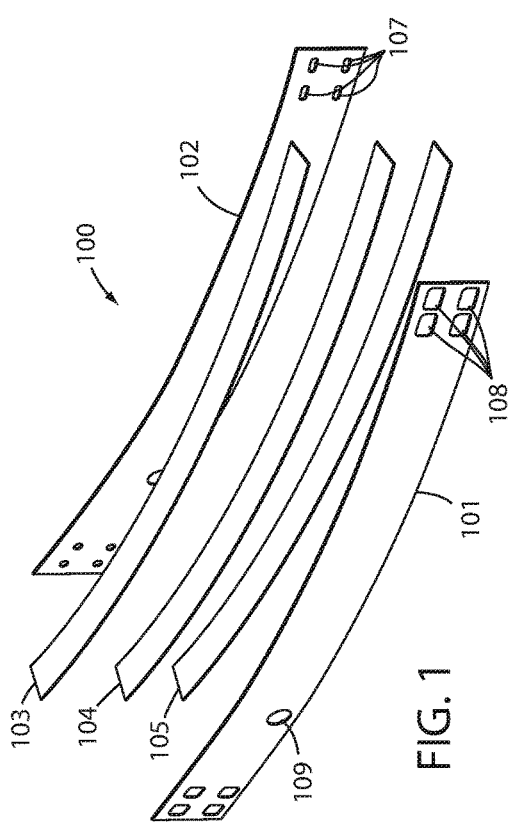
Figure 50:
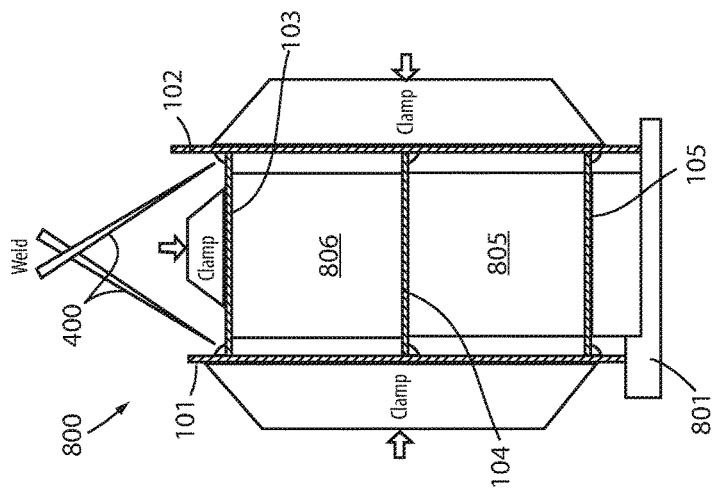
FIGS. 48-50 show fixturing and welding of the multiple sheets to form a beam, FIG. 48 showing welding of a first shear wall to front and rear walls, FIGS. 49-50 showing welding of additional shear walls.
Figure 49:
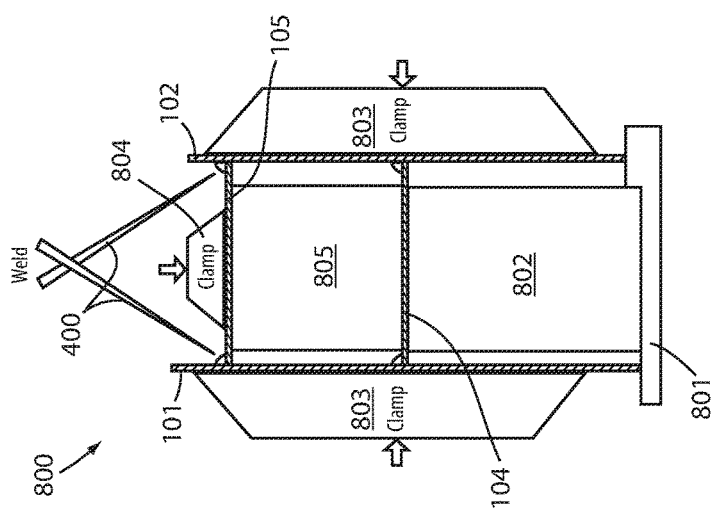
Figure 48:
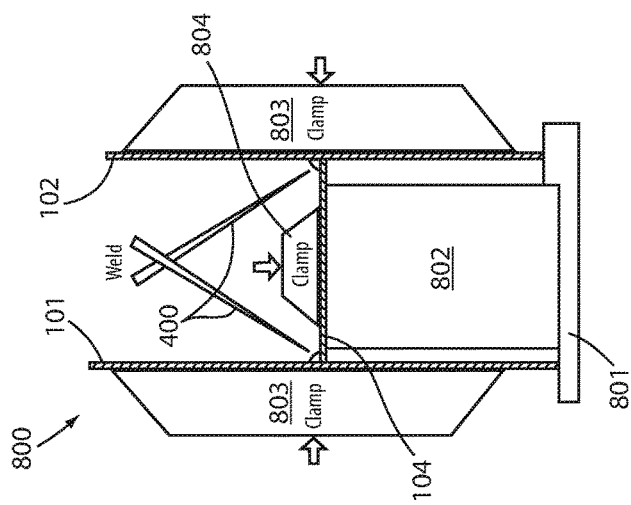

The beam 100 (FIGS. 1-3) is made from five sheets of aluminum, including sheets forming its front wall 101, rear wall 102, top horizontal shear wall 103, intermediate horizontal shear wall 104, and bottom horizontal shear wall 105. The shear walls 103-105 are generally planar, (but are pre-formed to have non-linear front and rear edges). The front and rear walls 101 and 102 matingly engage and are secured to the edges by continuous welds, such as welds located at the six non-radiused corners 106 (FIG. 3) formed when orthogonally-related sheets abut. The front and rear walls 101 and 102 are pre-formed to include attachment holes 107 in the rear wall 102 (also called "attachment structure" herein, and is intended to include welded-on brackets with holes) and access holes 108 in the front wall 101, and any other features desired such as accessory mounting hole 109. It is contemplated that the front and rear walls 101 and 102 (or other walls) can be pre-formed (i.e. roll formed, pierced, punched, or stamped), and can be non-planar or planar (e.g. when unstressed) but sufficiently flexible to take on the shape of the edges when biased into engagement by the welding fixture. (See for example the fixture in FIGS. 50-52.) Up flanges 110 and down flanges 111 on the front and rear walls 101 and 102 extend above and below the top and bottom shear walls 103 and 105, respectively.

The illustrated beam 100 (FIG. 3) can, for example, have thicker sheets forming the front wall 101 and the rear wall 102, and thinner sheets forming the shear walls 103-105. For example, when aluminum is used, the front and rear walls 101-102 can be 2 mm-5 mm thick material, or more preferably 2 mm-3 mm thick, and can be 80 ksi tensile strength material, or more preferably 120 ksi tensile strength (or more, especially the front wall); while the shear walls 103-105 can be 1.5 mm-3 mm thick material, or more preferably 1.5 mm-2.2 mm thick, and can be 60 ksi tensile strength material or more preferably 72 ksi to 87 ksi yield strength. It is noted that the aluminum can be selected from very high strength aluminum, including aluminum that is much higher in strength than extrudable grades of aluminum. When steel is used instead of aluminum, the front and rear walls 101-102 can be 1.0 mm-4 mm thick material, or more preferably 1.2-2.0 mm thick, and can be 190 ksi tensile strength material, or more preferably 220 to 250 ksi tensile strength or more (e.g. Martensite materials and ultra-high strength materials); and the shear walls 103-105 can be 0.8-3 mm thick material, or more preferably 1-1.5 mm thick, and can be 190 ksi tensile strength material, or more preferably 220 to 250 ksi material or more. A ratio of thicknesses of the front and rear walls 101-102 to the shear walls 103-105 can be important to total cost and/or beam function. For example, strips thickness ratios of front and rear walls 101-102 to the shear walls 103-105 is preferably in a range between a ratio 2:1 down to a ratio of almost 1:1. An outer dimension of the beam segment 100 can be 90 mm-150 mm high and 30 mm-80 mm fore-aft (deep), but it is noted that the beam can be made to be any size or shape for its intended function or intended environment. A length of the illustrated beam segment 100 matches a cross car dimension of a vehicle for which it is intended.

It is noted that only certain classes of aluminum material are extrudable. The aluminum materials having a highest tensile strength are not extrudable and generally considered not weldable. By using the present innovative concepts including welding techniques, beams can be made from aluminum stronger than the "extrudable" classes of aluminum. This allows beams to be made using a much wider range of aluminum materials than can be processed by extruding processes, including using stronger aluminum materials and/or thinner/thicker/multi-thickness aluminum sheet materials. In particular, higher strength aluminums lead to lower weight beams while maintaining strength properties.

The present apparatus (and related methods) have many advantages, including relatively low capital cost for equipment, reduced lead times for equipment, is easy to automate (leading to lower manual labor costs), and potentially provides reduced in-process inventory and reduced secondary processing. At the same time, the present apparatus is flexible and able to produce a wide range of beam shapes, including beams having non-radiused perpendicular corners (also called "zero-radius corners") well suited for optimal impact strength, beams having discontinuous walls, beams having strategically-located thicker and thinner sheets (or having strategically-located higher strength and lower strength sheets) at locations along the beam to provide best functional properties. It also allows formation of up (and down) flanges which extend above (or below) the beam, which is sometimes desired by vehicle manufacturers. Such flanges can help the manufacturer's vehicle pass impact testing, can support fascia, and can serve as mounting sites for various components, sensors and accessories.

The illustrated beam segment 100 (FIG. 3) has an up flange 110 extending above the front wall 101. This is sometimes specified by the vehicle manufacturer in order to provide support to adjacent components, such as support for the front end fascia or for supporting an attachment clip or wire clip. It is noted that the up flange 110 can be a consistent height, or can be increased near a center of the vehicle or increased at selected locations along its length.

Figure 24:
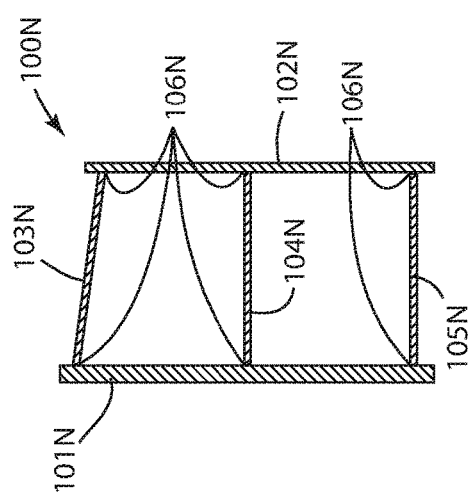
FIG. 24 is a cross-sectional view of a multi-sheet beam, where the intermediate and bottom horizontal shear walls form non-radiused perpendicular corners with the front and rear walls, but the illustrated top horizontal shear wall forms non-radiused corners that are 5-10 degrees off from a perpendicular angle, or more preferably 2-5 degrees off from a perpendicular angle.

Also, the illustrated beam 100 has non-radiused corners (also sometimes referred to as "square corners" or "T-shaped corners") where an edge of one sheet abuts a side of another sheet at a perpendicular 90 degree angle. (The phrase "non-radiused corners" is used herein to refer to 90 degree corners formed by abutting planar sheets, but is intended to include corners that are slightly varied from 90 degrees, such as 85 degrees or even 80 or 75 degrees (see FIG. 24.) This contrasts to traditional roll formed beams which necessarily have radiused corners (see FIGS. 27-28, and FIG. 29 where the radiused corners lead to early collapse upon impact). In roll formed beams having radiused corners, the inner radius typically has to be greater than at least about 4 times the thickness of the material to avoid shearing or fracturing the material at the corner as it is bent into the shape of the corner. The radiused corners tend to roll and provide a "softer" or lower initial resistance to impact, and hence a potential for a greater tendency of catastrophic collapse due to the existence of the radius (see FIG. 29). In contrast, the illustrated beam 100 with non-radiused corners does not have any corner radius at all. This provides advantages when impacted, since square corners provide an immediate and sharp rise in its resistance to the impact (commonly referred to as "highly efficient impact resistance" since a generally higher amount of energy is absorbed than in impact beam systems having a lower efficiency of impact resistance). Hence, a beam's resistance against catastrophic collapse is improved by the existence of non-radiused corners. It is contemplated that, even though non-radiused corners are preferred in the present innovative beams, some beams could be developed with some radiused corners. For example, a beam could be formed using a single sheet to form front, top, and bottom walls (i.e. with radiused corners joining same), with additional sheets forming the rear wall and intermediate shear wall (and having non-radiused corners).

Additional beams are described hereafter, with similar components, features, characteristics, and attributes being identified using the same number but with the addition of a letter such as "A", "B", and etc. This is done to reduce redundant discussion and not for another purpose.

Figure 17:
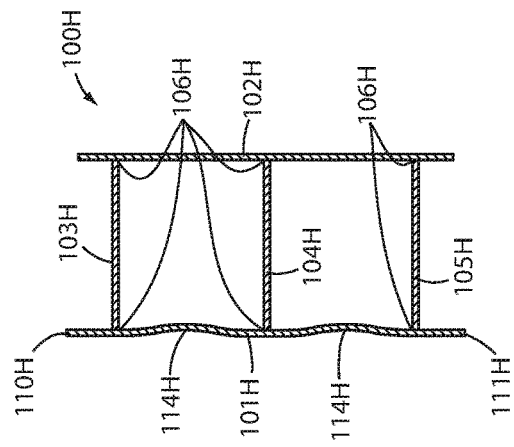

FIGS. 4-5 show a beam 100A similar to beam 100, but with channel ribs 114A in its front wall 101A, one channel rib 114A being centered over each tubular section of the beam 100A. Testing shows that channel ribs 114A help stabilize the front wall during an impact, leading to an improved impact resistance and/or an improved bending strength over an identical beam (100) without the channel ribs 114A. The channel ribs 114A can be as deep or shallow as desired in the beam for functional purposes. (Compare ribs in FIGS. 5 and 17.) The illustrated preferred channel rib 114A extends about 25% a width of the underlying tubular section, and the channel rib 114A is about as deep as it is wide. However, different channel depths are contemplated, including making the channel rib 114A so deep that a bottom of the channel rib 114A rests on the sheet forming a rear wall 102A of the beam 100A. The illustrated shear walls 103A-105A have edges that define a longitudinal shape of the beam, sometimes referred to as its sweep. The front wall 101A is formed to match a shape of the edges of shear walls 103A-105A. The rear wall 102A can be relatively planar (when unstressed) and deformed during fixturing to a shape of the rear edge of the shear walls 103A-105A (or can be pre-formed to shape). The illustrated edges of the walls 103A-105A (FIG. 4) are non-linear but generally parallel, such that a length of the beam defines constant cross-sectional dimensions.

A modified beam 100B (FIGS. 6-8) is similar to the beam 100A (FIGS. 4-5) but the beam 100B (FIGS. 6-8) has shear walls 103B-105B with non-parallel edges, such that its cross-sectional shape changes along a length of the beam 100B. Thus, beam 100B has a larger (deeper) cross-sectional dimension in a depth direction in its center region (FIG. 8), and a narrower (shallower) cross-sectional dimension in a depth direction at its outboard ends (FIG. 7). This beam 100B provides a more aerodynamic appearance to the leading end of the vehicle. It is noted that bumper reinforcement do not require as high of bending strength at the structural mounts on ends of the beam where the beam is bolted to a vehicle frame or to vehicle crush tubes. Contrastingly, near a center of the beam 100B, it is desirable to have a greater bending moment (i.e. larger cross-sectional shape) in order to pass IIHS offset overlap impact tests. (See FIG. 34.) The beam 100B can have a lesser swept center section (i.e. a larger-radius when viewed from above) and more sharply swept end sections (i.e. smaller-radiis when viewed from above).

Figure 9:
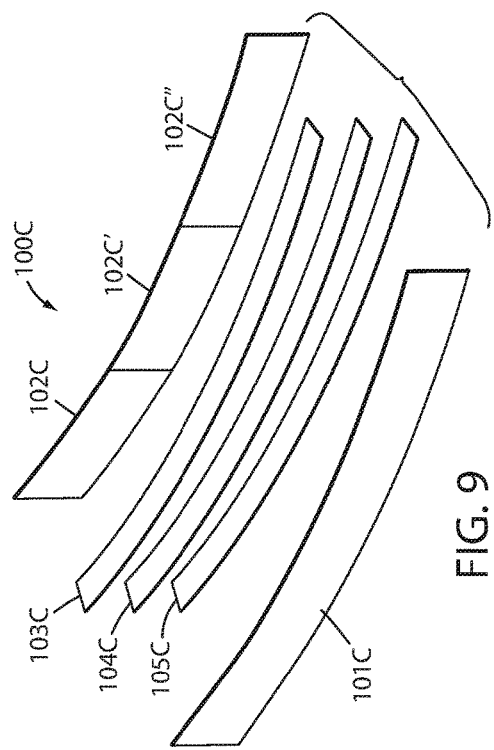
FIG. 9 is an exploded perspective view of a multi-sheet beam made from five preformed sheets, similar to FIG. 2, but the beam having a rear wall with thicker/different material in a center region and thinner/different material in end regions.

The sheets in beams can have different thickness and strengths as desired for optimal performance, and also a particular sheet could have different sheet segments welded together end to end. For example, a beam 100C (FIG. 9) has a rear sheet 102C with a center portion 102C' made of steel having a thickness of 2 mm and that is about 16-20 inches long. Outboard sheets 102C'' for example could be a similar steel material but having a thinner thickness, such as 1.0-1.5 mm thickness. The sheets 102C' and 102C'' are welded together, such as along a laser weld line, to form a continuous "hybrid" sheet extending a length of the beam 100C. The resulting hybrid rear wall 102C could result in a large amount of material mass savings. A same arrangement can be done on a front wall 101C, or on shear walls 103C-105C.

Figure 10:
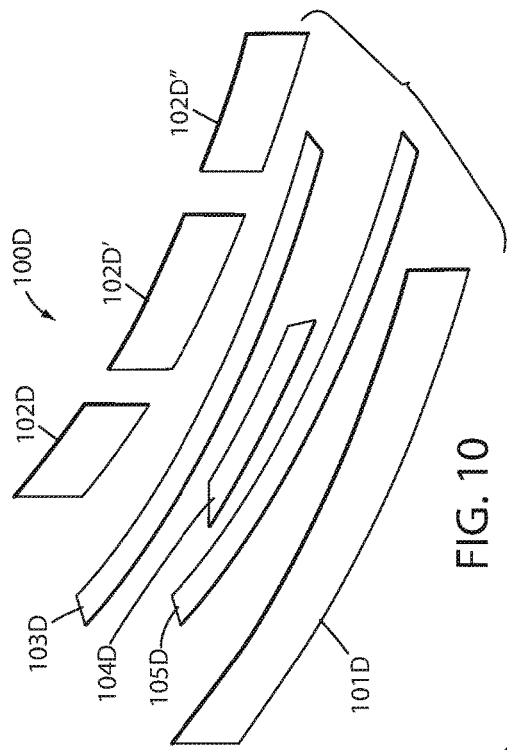
FIG. 10 is an exploded perspective view of a multi-sheet beam similar to FIG. 9 but made from seven preformed sheets, including a short center sheet and two shorter end sheets forming the rear wall of the beam (with gaps between the center sheet and two shorter end sheets), and the intermediate horizontal shear wall being similar in length to the center sheet in length but having outwardly angled end surfaces.

Beam 100D (FIG. 10) is similar to beam 100C, but in beam 100D, a rear center portion 102D' is not connected to a rear outboard portion 102D''. Instead, there is a gap between the portions 102D' and 102D'', such as gaps that are generally about 4-10 inches long. Also, an intermediate horizontal shear wall 104D is similar in length to the center rear sheet 102D', but notably it may be somewhat longer than the center rear sheet 102D' in length so that the ends of the center rear sheet 102D' do not align with ends of the shear wall 104D. This is done to avoid adversely affecting bending strength of the beam at that point. Outer ends of the intermediate horizontal shear wall 104D extend at an outboard angle as they extend from the rear wall 102D toward the front wall 101D. Notably, it is contemplated that the ends of the intermediate shear wall 104D can be linear, or curved, or otherwise any shape desired to optimize beam strength and impact properties while minimizing beam weight.

Figure 11:
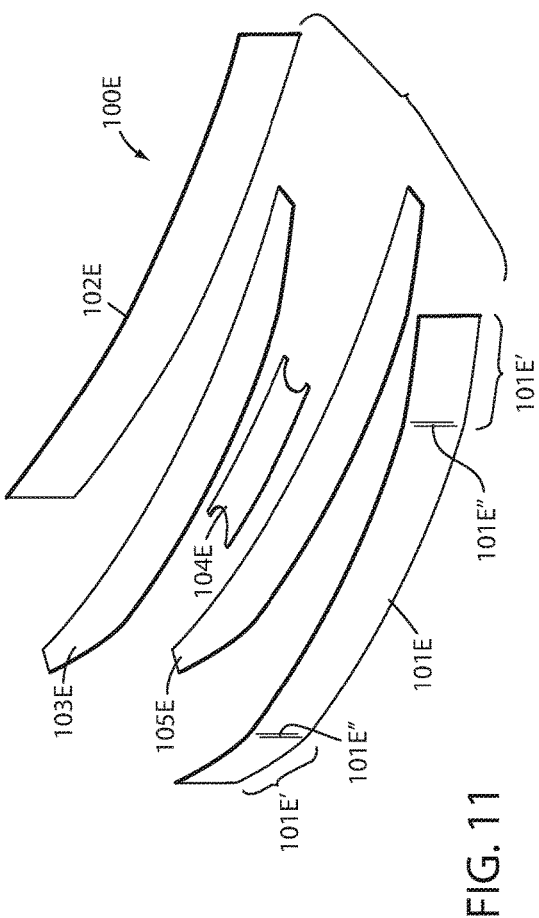
FIG. 11 is an exploded perspective view of a multi-sheet beam similar to FIG. 2 and made from five sheets, including a preformed front wall having rearwardly-deformed end sections starting at noticeable bends at outer edges of the center region (and optionally including channel ribs), and an intermediate horizontal shear wall foreshortened and having concavely shaped end portions.

Beam 100E (FIG. 11) includes a preformed front wall 101E having rearwardly-deformed end sections 101E' defining a vertical bend line 101E''. The bend line 101E'' is not a sharp bend, but instead is a gradual curve formed to avoid concentration of stress and to provide a good transition from the center to ends of the beam. The front wall 101E may or may not include channel ribs (114A), and these may or may not extend a length of the beam. An illustrated intermediate horizontal shear wall 104E is foreshortened and has concavely shaped end portions. Top and bottom horizontal shear walls 103E and 105E are relatively planar, but have a front edge matching a shape of the front wall 101E. The rear edge of the shear walls 103E-105E are non-linear and non-parallel and generally curved to define a desired shape. The sheet for a rear wall 102E is relatively planar and flexible, such that it is planar when unstressed, but so that it bends to match a shape of the rear edge of the shear walls 103E-105E when fixtured and pressed thereagainst. (See FIGS. 1, 4, 6, and 48-50.)

Figure 13:
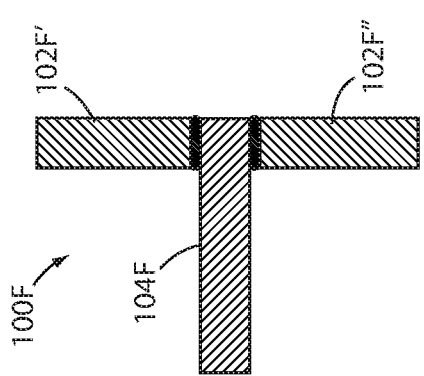
FIG. 13 is an enlarged view of a circled area (a T corner) in FIG. 12.
Figure 12:
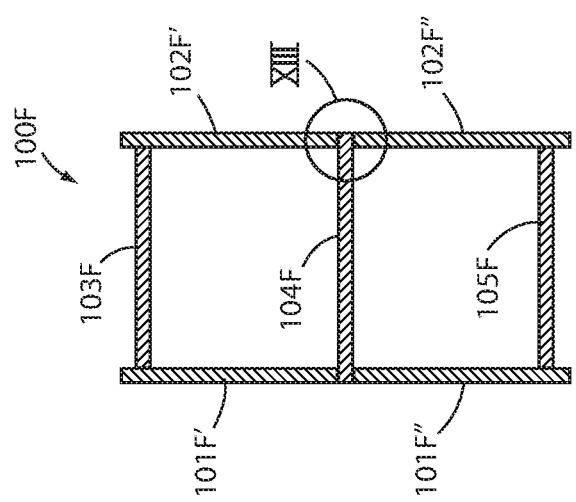
FIG. 12 is a cross section of a multi-sheet beam, where the intermediate horizontal shear wall has edges extending to front and rear surfaces of the beam, and where upper and lower front sheets combine with the front tip of the intermediate horizontal shear wall to form the front wall of the beam, where upper and lower rear sheets combine with the rear tip of the intermediate horizontal shear wall to form the rear wall of the beam, and where top and bottom horizontal shear walls abut inward surfaces of the combination front wall and combination rear wall.
Figure 16:
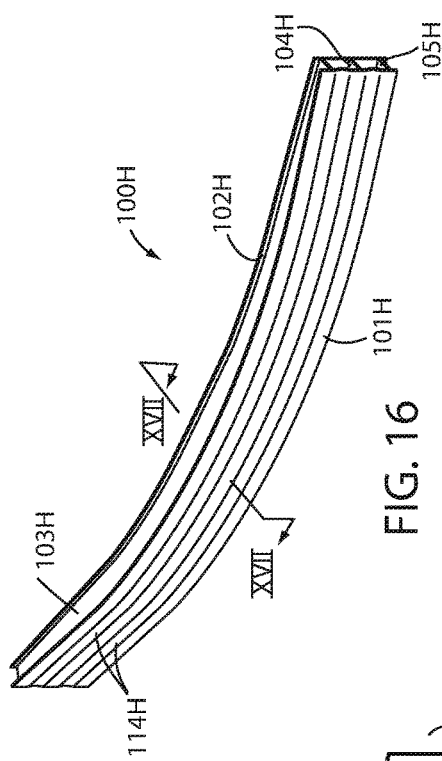
FIGS. 15-17 are exploded, perspective, and center cross-sectional views of a variable depth multi-sheet aluminum beam, the beam having a constant cross section across its center region and rearwardly narrowing end cross sections, with all cross sections having a shallower depth than the beams in FIGS. 1-8 and having shallower channel ribs in its front wall.

Beam 100F (FIGS. 12-13) is made of seven sheets of aluminum. An intermediate horizontal shear wall 104F extends to and forms a part of the front and rear surfaces of the beam 100F. Two upper and lower front sheets 101F' and 101F'' combine with the front tip of the intermediate horizontal shear wall 104F to form a front wall 101F. Two upper and lower rear sheets 102F' and 102F'' combine with the rear tip of the intermediate horizontal shear wall 104F to form the rear wall 102F of the beam 100F. Top and bottom horizontal shear walls 103F and 105F abut inward surfaces of the combination front wall 101F and the combination rear wall 102F. It is noted that friction stir welding described below (see FIGS. 46-47) is particularly well adapted to bond the center weld on the beam 100F in a manner maintaining a smooth "flat" front surface. FIG. 13 is an enlarged view of a circled area XIII in FIG. 12 at the center of beam 100F (a T corner). Notably, preferably a welding process is used so that no weld material extends away from the welded corner. Restated, there is essentially no weld bead. Instead, all of the weld material is captured within the corner as illustrated, and hence the front surface (and/or rear surface if a similar weld is used) is "flat".

Figure 14:
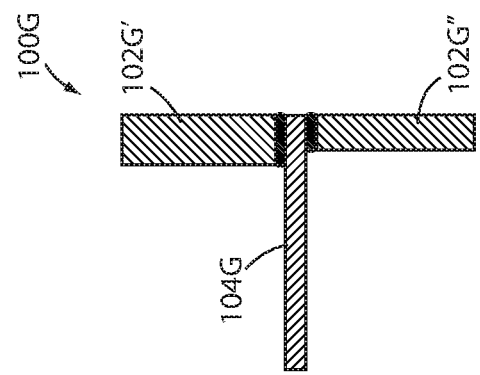
FIG. 14 is an enlarged view similar to FIG. 13 but where the various sheets forming the T corner have three different thicknesses.

In beam 100F (FIG. 13), all abutting sheets have a similar thickness. However, in a modified beam 100G (FIG. 14) the various sheets forming the corner each have different thicknesses. Thus, beam 100G has dissimilar materials or dissimilar thickness materials top to bottom on a given sheet. This beam 100G presents novel properties since it provides a lower (or higher) bending strength along the lower tubular section of the beam 100G.

Figure 15:
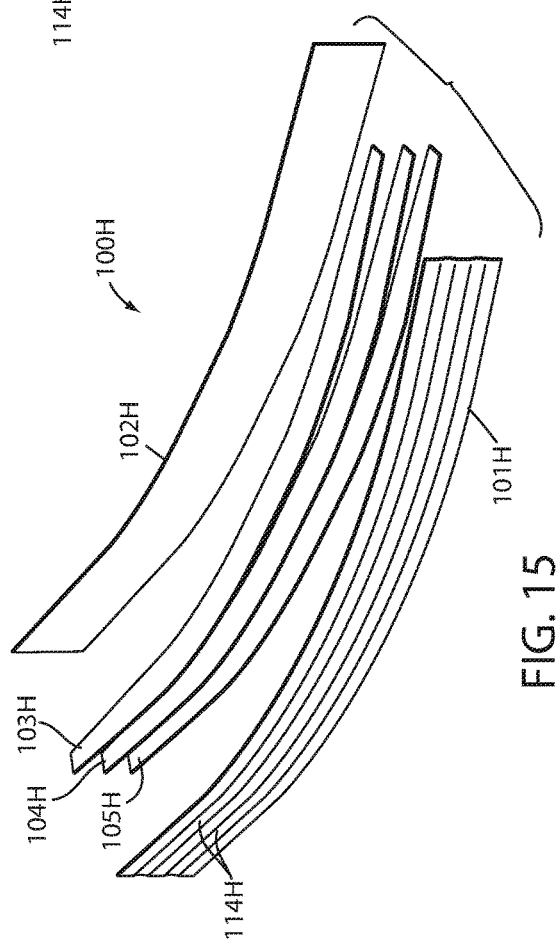

Beam 100H (FIG. 15) is similar to beam 100B (FIG. 6), but beam 100H has a generally thinner fore-aft dimension along its length, and a sharper bend on a front wall 101H as it transitions from a first sweep (first curve) along the center of the front wall to a sharper second sweep (second curve) along the outboard ends of the front wall 101H. Also, a channel rib 114H is shallower than the rib 114B in beam 100B. (Compare FIG. 17 and FIG. 8.)

Beam 100J (FIG. 18) has a shape similar to beam 100 (FIG. 1), but beam 100J has an intermediate horizontal shear wall 104J that is non-planar. Specifically, the shear wall 104J has an undulating or wavy shape, with one wave on each side of center. More or less waves can be formed by the shear wall 104J, or sharp zig-zag bends can be made, and also the waves can be consistent or inconsistent in width or height of undulation.

Beam 100K (FIGS. 19-21) is similar to beam 100 (FIG. 1), but beam 100K has a top shear wall 103K that is arch-shaped, and the front and rear walls 101K and 102K match its shape. Thus, the two tubes formed by beam 100K are dissimilar in a center region (see FIG. 21) but similar at the beam's ends (FIG. 20). In particular, the illustrated bottom tube section maintains a constant shape, but the top tube varies from a largest shape in the center (FIG. 20) to a narrower tube at the ends (FIG. 21).

Beam 100L (FIG. 22) is similar to beam 100K, but a top shear wall 103L has an even greater arcuate shape. It is noted that the top shear wall 103L can follow a top edge of the front wall 101L, or it could extend in a horizontal plane.

Figure 23:
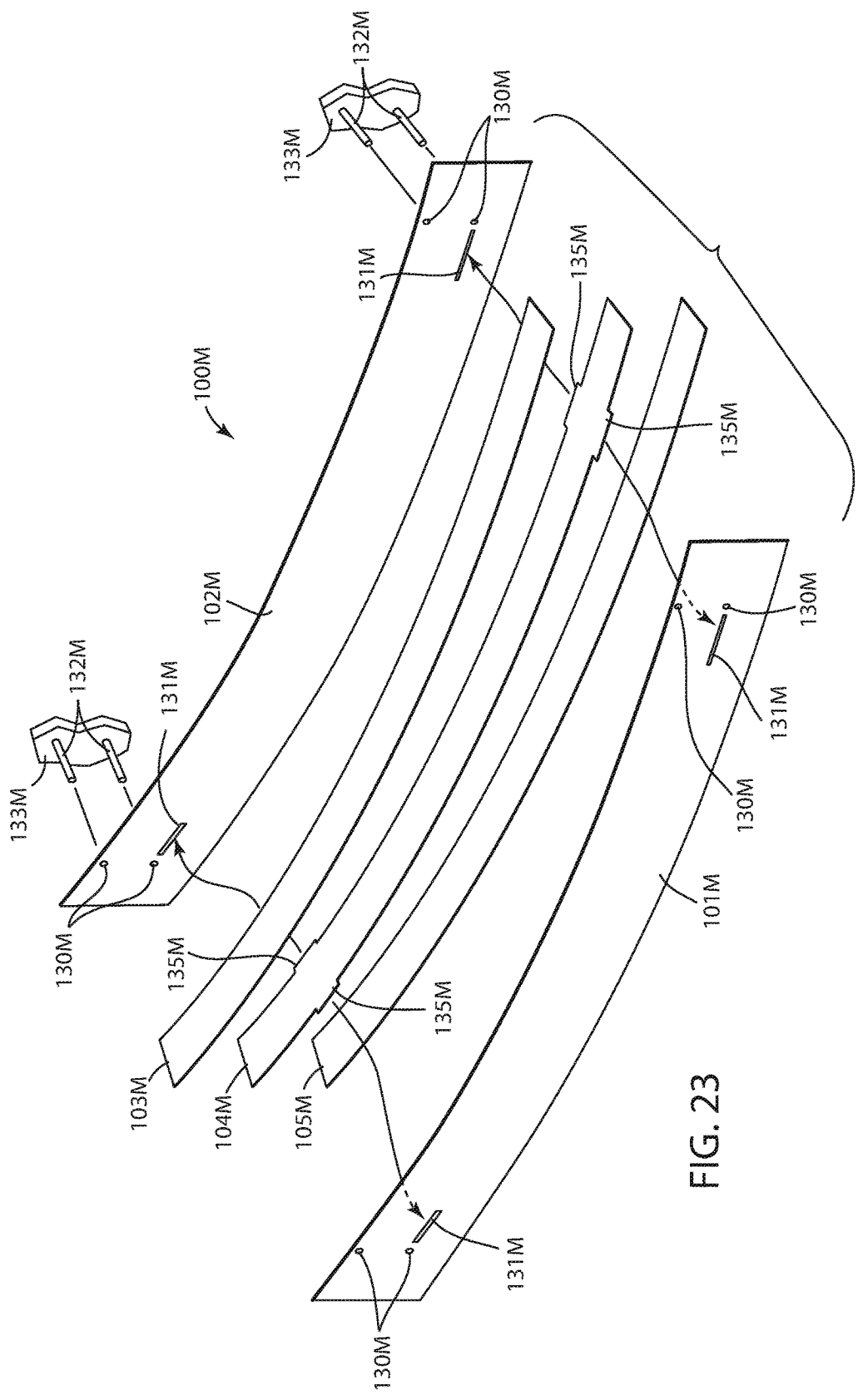
FIG. 23 is an exploded view of a multi-sheet beam, the front and rear walls having fixturing holes and wall-locating slots, with one or more of the three shear walls having slot-engaging tabs that locate into the wall-locating slots, and the fixture having pins engaging the fixturing holes.

Beam 100M (FIG. 23) includes front and rear walls 101M and 102M with fixturing holes 130M and wall-locating slots 131M. The fixturing holes 130M in the front (and rear) walls 101M and 102M engage pins 132M in a fixture 133M to accurately locate the sheets 101M-105M when positioned in the fixture 133M. One (or more) of the three shear walls 103M-105M have tabs 135M (note that tabs 135M are only shown on the intermediate shear wall 104M) that locate into mating wall-locating slots 131M, thus accurately locating the horizontal shear walls 103M-105M on the front (and rear) walls 101M and 102M during welding. The fixturing holes 130M and slot-tab structures 131M/135M simplify the fixtures needed for assembly. It is noted that the fixtures can also include other securement devices, such as clamps and mechanical holders (engaging two sides of sheets to hold them), or vacuum cups and magnets (engaging one side of sheets to hold them), and/or can include other means known in the art for accurately locating adjacent parts for welded assembly. See FIGS. 50-52 described below.

Beam 100N (FIG. 24) has top, bottom and intermediate horizontal shear walls 103N-105N that form non-radiused corners 106N with front and rear walls 101N and 102N. The intermediate and bottom horizontal shear walls 104N and 105N form non-radiused perpendicular corners. However, the top horizontal shear wall 103N extends at an angle to horizontal, such that it forms a non-radiused corner that is about 1-10 degrees off from a perpendicular angle, or more preferably 2-5 degrees off from a perpendicular angle (when used as a bumper reinforcement beam). It is contemplated that the beam 100N could be "flipped" so that the angled wall is on a bottom of the beam when in a vehicle-mounted position.

Figure 26:
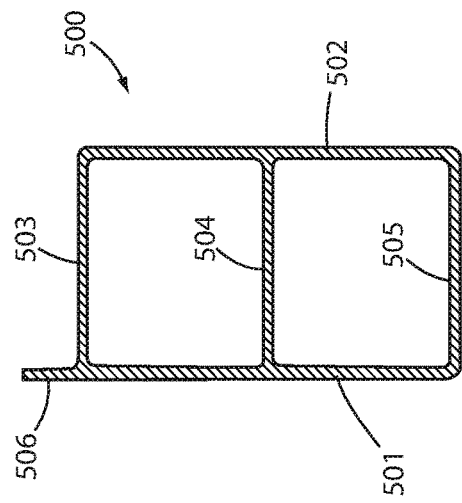
FIGS. 25-26 are perspective and cross-sectional views of a prior art extruded aluminum beam with double tube design and front up flange.
Figure 25:
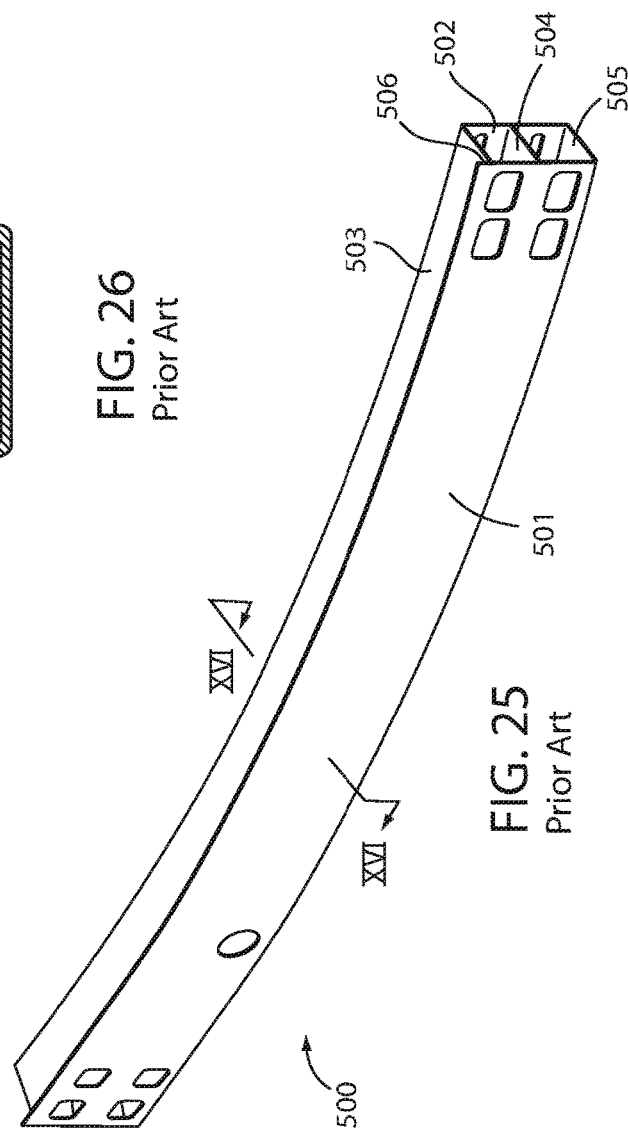

FIGS. 25-26 illustrate an extruded aluminum beam 500 in prior art used as a baseline for comparison to multi-sheet beams incorporating the various concepts noted above. The beam 500 includes front, rear, top, intermediate, and bottom walls 501-505 and a front up flange 506.

FIGS. 27-28 illustrate a roll formed steel beam 600 made of high strength steel in prior art used as a baseline for comparison to multi-sheet beams incorporating the various concepts noted above. The roll formed steel beam 600 includes front, rear, top, intermediate, and bottom walls 601-605 defining radiused corners 608 and includes channel ribs 606 over the tubes in the beam 600.

FIG. 29 illustrates an impact against the beam 600, where it's cross-sectional shape changes as it begins to collapse during an impact. It is noted that deformation tends to start at the radiused corners, which leads to instability in all walls of the roll formed beam and hence leads to "early" catastrophic collapse of the beam.

A beam 600A (FIG. 30) is similar to beam 600, but its ends are angle cut in a secondary operation, and a cap 609A is welded onto each end. The caps 609A form a sharply rearwardly-cut rearwardly-extending end to a front wall 601A, adding to side impact strength and desired properties. However, the caps 609A also add to the bumper's total weight and cost from secondary processes.

A multi-sheet beam 100P (FIG. 31) is similar to beam 100A (FIG. 4), but beam 100P includes a front wall 101P with an outboard end section 100P''' that is sharply bent rearwardly, and includes shear walls 103P-105P with a matching front edge to abuttingly engage the front wall 101P. Thus, the angle-cut shape of beam 100P is integrated into the existing components, eliminating secondary operations, avoiding additional weight, yet providing a similar look and function to the roll formed beam 600A described above.

FIGS. 32-34 show tests commonly used to measure performance of bumper reinforcement beams. FIG. 32 illustrates a three-point bending test used to test bumpers. We used an 880 mm span of support and targets of 7.6 kN-m bend strength when tested. FIG. 33 illustrates an IIHS 100% overlap impact test. FIG. 34 illustrates an IIHS 73.2 mm offset overlap impact test. Notably, the offset cause's significant torsional loading on the beam during impact, especially near a center of the beam which is spaced from the vehicle mounts (at ends of the beam). IIHS stands for Insurance Institute for Highway Safety, and has known bumper test standards widely used in the automotive industry.

To summarize a related method of manufacturing, a method of manufacturing the bumper beam comprises providing multiple strips of selected (potentially different) material properties and thicknesses for forming front, rear, top, center and bottom walls of a beam; shearing edges of all sheets and forming holes in any sheet necessary (such as shearing edges of the top, center, and bottom walls to form a varied width along their length); shaping the walls as needed (such as to form a channel ribs or other feature in the front wall); fixturing the front and rear walls in abutting contact with one or more of the top, center, and bottom walls; welding the same together; and repeating the steps of fixturing and welding with the remaining of the top, center and bottom walls.

Figure 36:
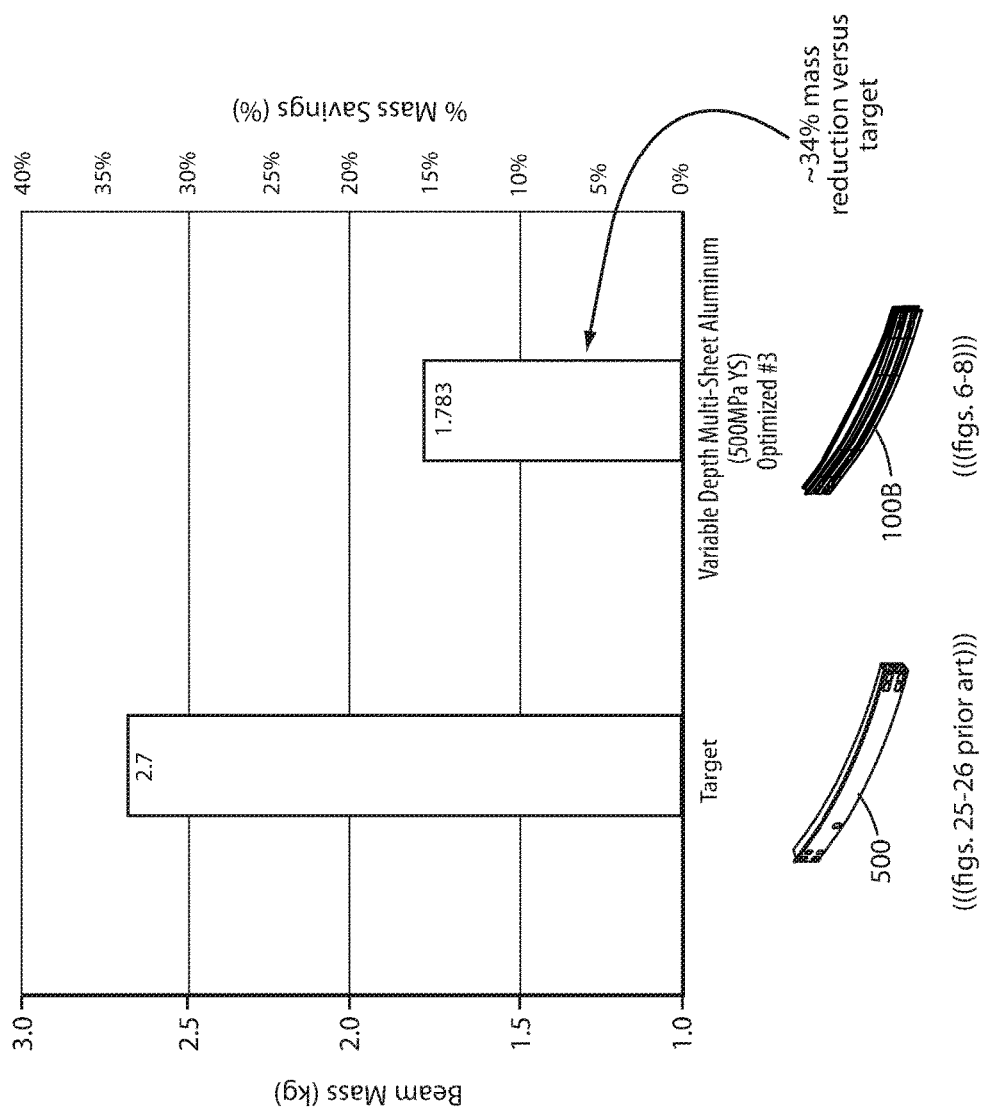

FIG. 35 is a graph comparing beam mass for a constant-depth multi-sheet beam 100A (FIG. 4) and a varied depth multi-sheet beam 100B (FIG. 6) compared against a target extruded aluminum beam 500 (FIG. 25). The beams 100A, 100B, and 500 fit into a same vehicle package space and have an equivalent IIHS bumper impact test performance. The beams 100A and 100B used high strength (non-extrudable) aluminum optimally placed for strength and properties, and to minimize weight. This study suggested that there is a great opportunity for mass savings, since beam 100A offered a large mass savings, and beam 100B offered an even greater potential mass savings (of about 20% mass savings) while maintaining a same IIHS impact test performance. By optimizing material properties along a length of the beam and around a cross section of the beam, even greater mass savings can be achieved over the known prior art aluminum extruded beam, with mass savings being as much as 34%, as shown in FIG. 36.

Figure 37:
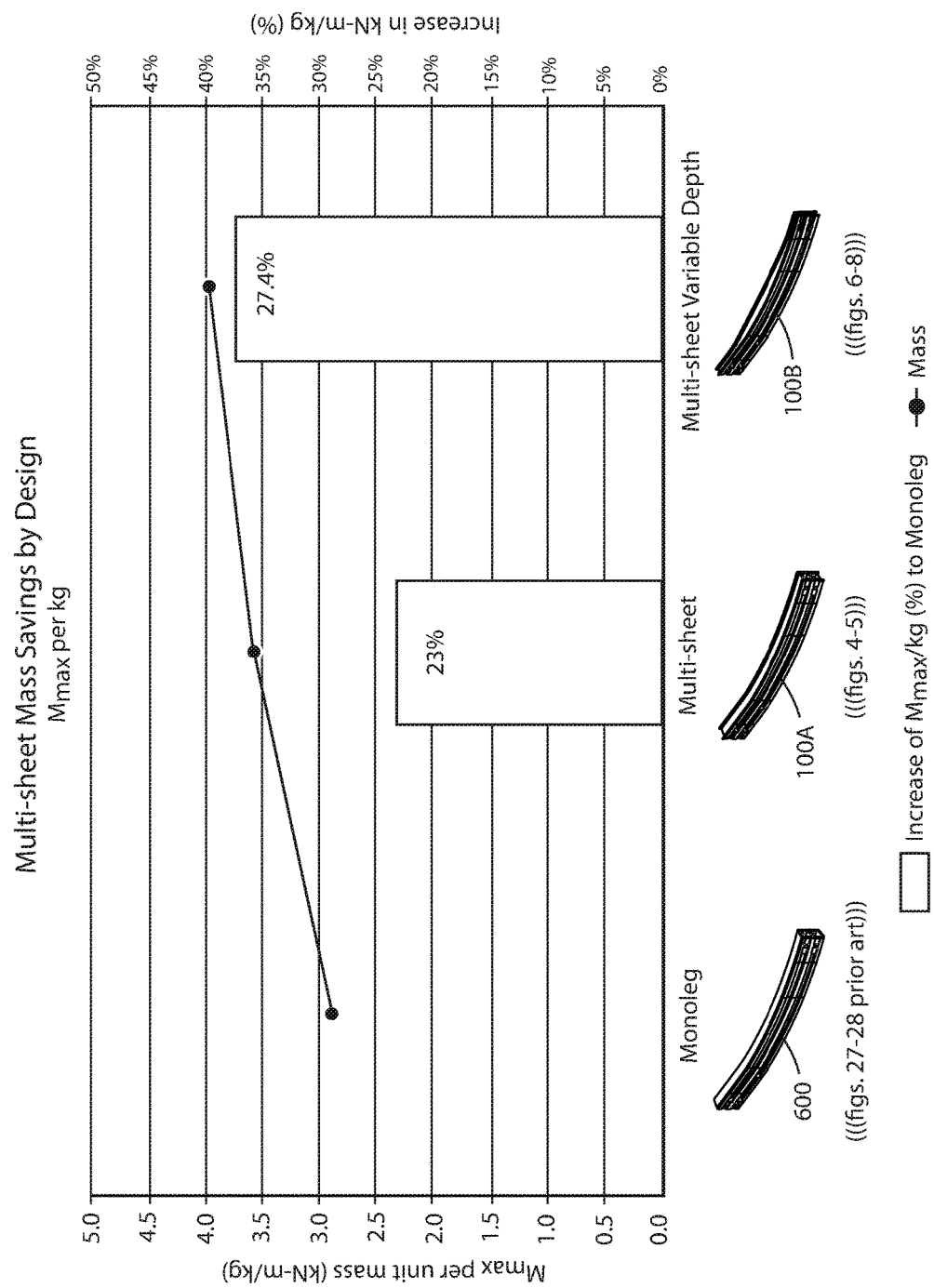
FIGS. 37-39 are charts comparing mass savings of a multi-sheet steel beam of constant cross section (see FIG. 4) and a multi-sheet steel beam of varied cross section (see FIG. 6) over a roll formed steel beam (see FIG. 27), FIG. 37 comparing mass savings for beams fitting into a same package space and having equivalent bending moment.

FIG. 37 is a chart comparing maximum bending moment per unit mass for three different beams, including a prior art roll formed (double tube) baseline monoleg beam 600 (FIG. 27) made of steel material, a multi-sheet beam 100A (FIG. 4) with constant cross section and channel-ribbed face, and a multi-sheet beam 100B (FIG. 6) with varied cross section and channel-ribbed face. The test was to measure a maximum bending moment per kilogram. The test was not based on equal beam performance nor equal beam mass. As shown, the multi-sheet beam 100B with varied cross section provided a much greater bending moment per unit mass by 27.4% over the prior art baseline monoleg beam 600. Even the multi-sheet beam 100A with constant cross section provided an improved bending moment per unit mass by 23% over the baseline prior art beam 600.

Figure 38:
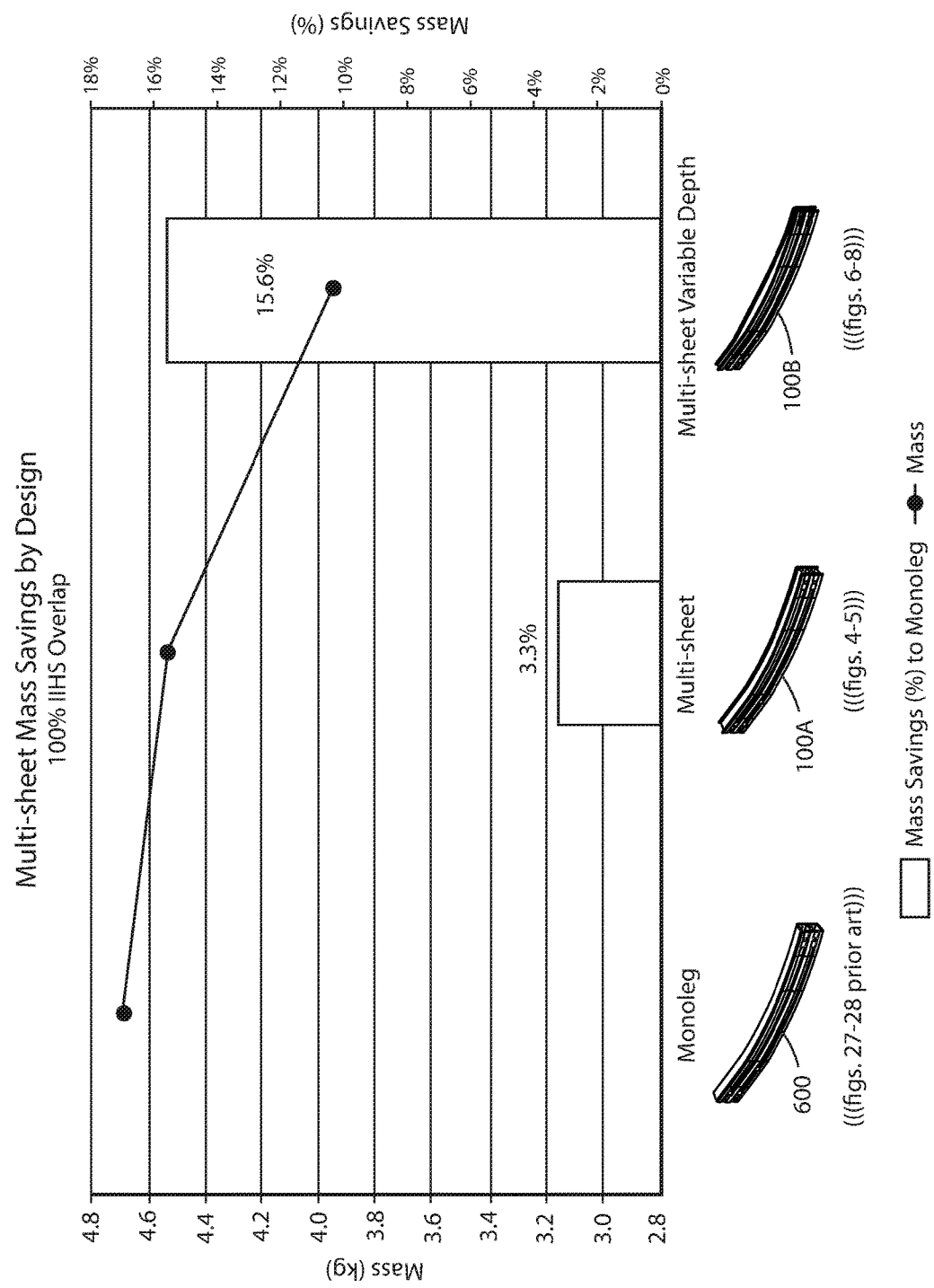

FIG. 38 is a chart comparing mass for the beams in FIG. 37, each having a similar performance in an IIHS 100% overlap impact test. Specifically, the beams include the prior art roll formed (double tube) beam 600 (FIG. 27), a multi-sheet beam 100A (FIG. 4) with constant cross section, and a multi-sheet beam 100B (FIG. 6) with varied cross section. The beam 100B provided a 15.6% mass reduction, while the beam 100A provided a 3.3% mass reduction, over the prior art baseline beam 600. It is noted that different sheet thickness combinations were used to optimize performance.

Figure 39:
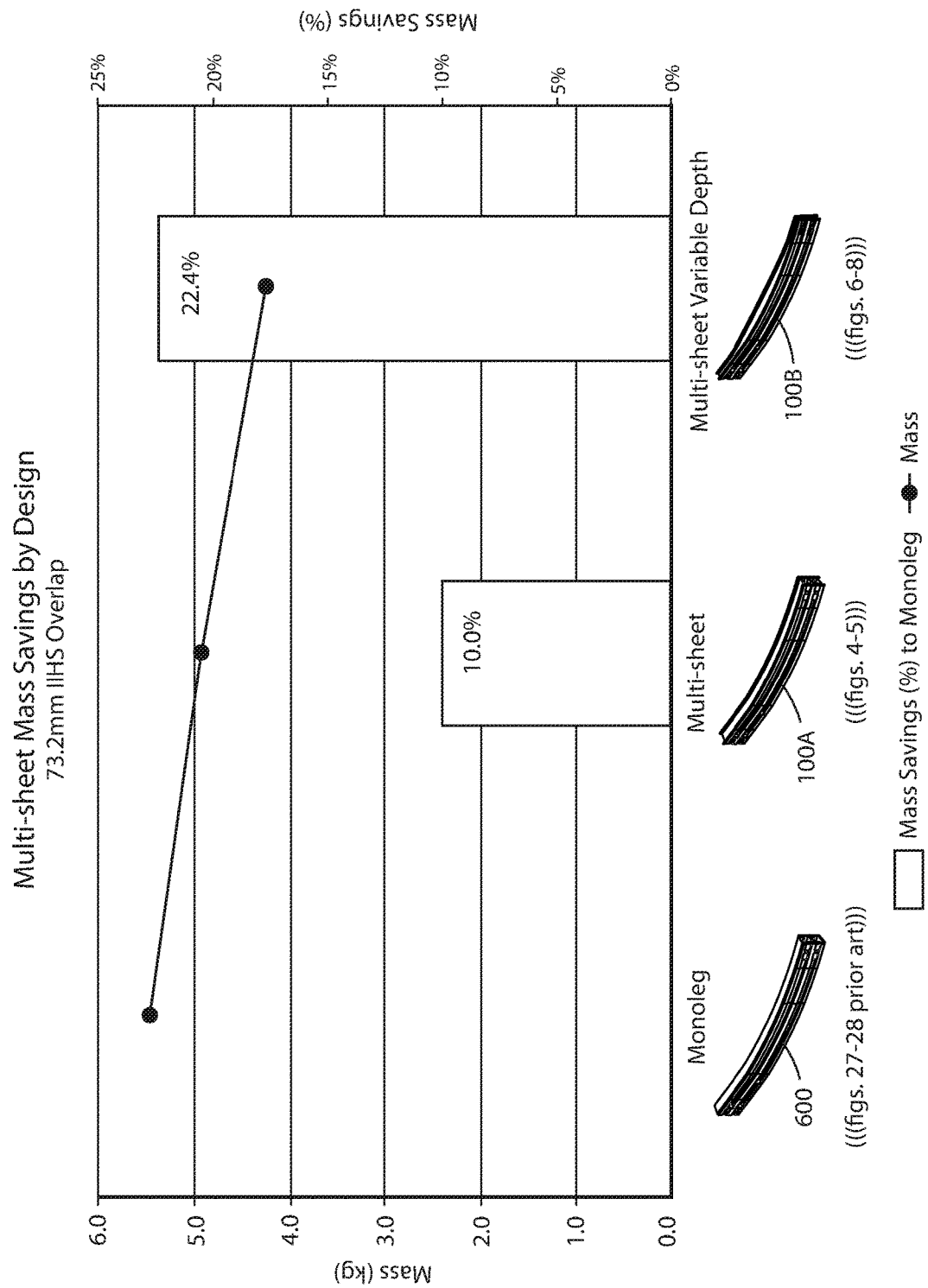

FIG. 39 is a chart comparing mass for the same three different beams compared in FIG. 37, each having a similar performance in an IIHS 73.2 mm overlap impact test, but where the beams have a different mass to accomplish the offset impact performance. The chart shows that the beam 100B had a 22.4% mass savings over the prior art roll formed beam 600 while providing an equivalent IIHS 73.2 mm overlap impact test result. Again, it is noted that different sheet thickness combinations were used to optimize performance.

It is contemplated that novel welding methods can be used to minimize (nearly eliminate) the heat-affect-zone around a weld. This can be particularly important in bumper reinforcement beams used in vehicle bumper systems, since bumper systems have numerous test standards set by IIHS (Insurance Institute Highways Safety standards) and FMVSS (Federal Motor Vehicle Safety Standards) agencies. Notably, welding processes and welds that create high heat also degrade the physical properties of material around and adjacent the weld. It is noted that the impact and bending strengths and test standards for bumper reinforcement beams are very sophisticated, and relate to pole tests, pendulum tests, overlap (vehicle-to-vehicle simulating) impact tests, pedestrian impact/injury tests, occupant safety tests, and numerous other tests.

Figure 42:
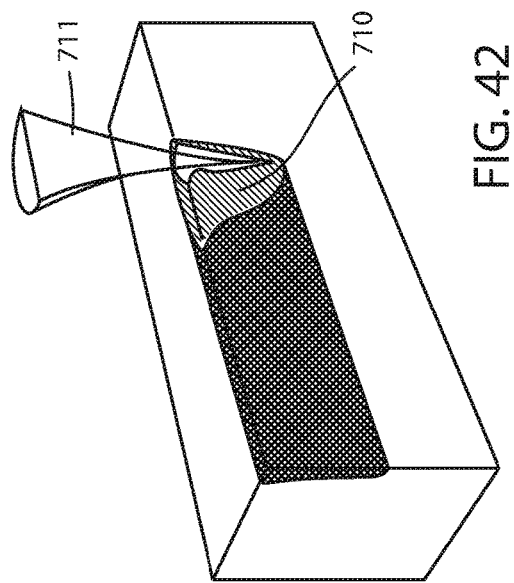
FIG. 42 is a perspective view of a typical prior art laser weld, which includes a smaller HAZ region.
Figure 40:
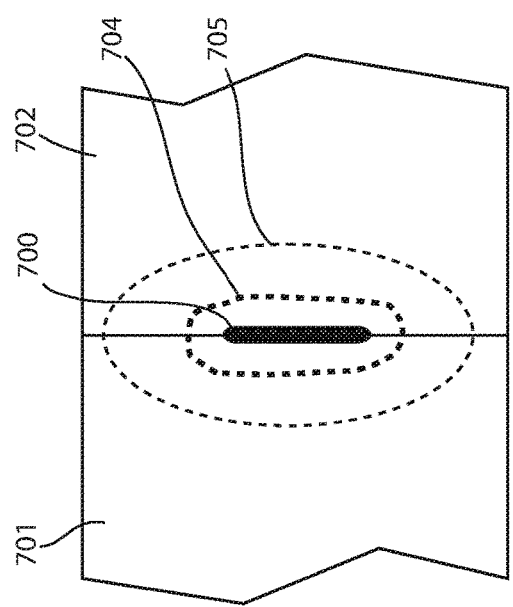
FIGS. 40-41 are plan and side views of a traditional MIG weld in prior art, the view showing a weld bead and a heat-affected-zone (also called a "HAZ region") extending 5-15 mm (or more) from the edge, the HAZ region having material properties significantly reduced due to heat generated during the welding process, leading to significantly reduced impact performance characteristics.
Figure 41:
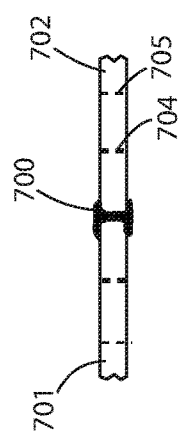

Degraded material properties (i.e. areas of reduced strength in high strength steels or aluminums) generally have lower impact strengths and less consistency of properties and less predictable energy absorption during an impact. FIG. 40 schematically shows the effect of heat-affect-zones around welds in traditional welding processes where heat is used to create molten metal that bonds adjacent components. The illustrated MIG weld (or could be TIG weld) adds weld material 700 (also called a "weld bead") to bond adjacent sheets 701 and 702. The weld bead 700 extends about 3-10 mm outward from the wall stock forming the corner (or flat) being welded. The weld bead 700 creates a puddle or pool of weld material at and along the corner, but further causes a high heat region 704 that extends much farther than the weld bead, such as 15-20 mm outward from a corner being welded. Still further, depending on a sensitivity of the material, an adversely affected region 705 (called a "heat-affected-zone" or "HAZ") will extend even farther, such as 15-25 mm from the corner. Laser welding (FIG. 42) is also a known welding process, where material 710 at the weld site is melted by laser energy 711 to create a pool of material that when cooled bonds adjacent material.

We have found three welding processes that control the heat-affected-zone particularly well, in our opinion. These include cold metal transfer welding (CMT) (FIGS. 43-45), friction stir welding (FSW) (FIGS. 46-47), and homogenous laser welding (not illustrated). It is noted that each of these processes are publically known and commercially available, though their use is not widespread to our knowledge. In particular, we are not aware of any bumper reinforcement beams made using any of these processes, nor beams designed for crash impact made using any of these processes.

Cold metal transfer (CMT) welding is a process promoted and commercially available from several companies, including for example a company named Fraunhofer. FIGS. 43-45 illustrate one (of the several) cold metal transfer welding processes, and it includes an ability to minimize the heat-affect-zone around the weld to less than about 3 mm, and potentially less than about 1.5 mm. The process includes providing limited and focused energy for welding from a well-aimed well-calibrated laser 400 while feeding a cold (meaning non-electrically charged) wire stock 401 to the weld site as needed to initiate welding and for welding material (illustrated as sheets 104F and 102F', from FIG. 12). Notably, the amount of welding material added to the weld by the cold wire 401 is minimal (including a small size of the wire and potentially slow or oscillatingly movement/feeding of the wire), and further the laser 400 is closely controlled to minimize heat buildup. Thus, the heat-affect-zone around the weld site is minimal, such as less than 3 mm or even as low as 1 mm from the corner as noted above. There is essentially zero weld bead extending outside the welded corner.

FIGS. 46-47 are side views of a friction stir welding process, which is a commercially available process promoted and sold by ESOB Company. Friction stir welding (FSW) is a solid state weld process so it nearly eliminates loss of properties from heat input from welding. In friction stir welding, a tool 420 moves cyclically or oscillatingly in a manner causing friction around a location closely associated with the weld site 421, causing material from the sheets 104F and 102F' and 102F''' to bond without additional weld material, thus minimizing excess heat added to the welding site during welding. No exterior material is added to the weld site. Instead, material from immediately adjacent areas are made sufficiently mobile to bond adjacent sheets 104F and 102F' and 102F'''.

Homogenous laser welding (not illustrated) is a commercially known process that does not require a detailed explanation herein for an understanding by persons skilled in this art. It also can be used to minimize heat buildup during welding.

In each of the above welding processes (cold metal transfer welding, friction stir welding, homogenous laser welding), minimal or zero material is added to the weld site. They do not leave a weld bead that extends 3-5 mm from the weld site. Concurrently, they minimize heat at the weld site, thus minimizing the heat-affect-zone to only a very short distance (e.g. a few millimeters) from the corner being welded.

The sheets 101-105 can be fixtured in different manners, depending on a shape of the sheets and the type of welding used. Fixture 800 (FIG. 48) uses a base 801 with upright block 802, side clamps 803 and a top clamp 804 to hold sheets 101, 102, and 104 together. The illustrated welding process is a CMT welding process with laser 400 and cold wire (not shown). The process is repeated in FIG. 49 using an additional center block 805 to hold sheet 105. Thereafter, in FIG. 50, the partial beam is inverted, and the last sheet 103 is fixtured by block 806 and welded. It is contemplated that many different fixturing methods and procedures can be used. For example, the beam may be welded from a bottom instead of being inverted (not illustrated, but see FIG. 50), or the beam may be rotated 90 degrees and welded from a side (not illustrated).

Figure 51:
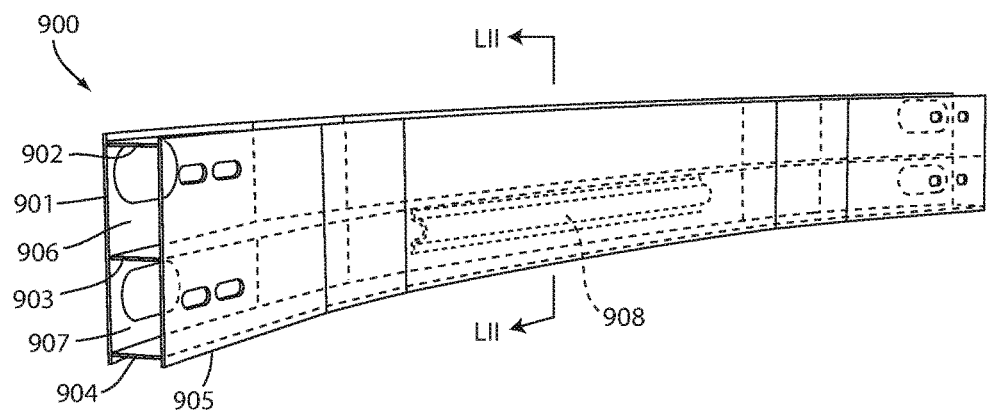
FIGS. 51-52 are perspective end views of a swept double-tube bumper reinforcement beam with a 12-18 inch hat-shaped internal reinforcement centered on a "flat" front wall of the beam's lower tube.
Figure 52:
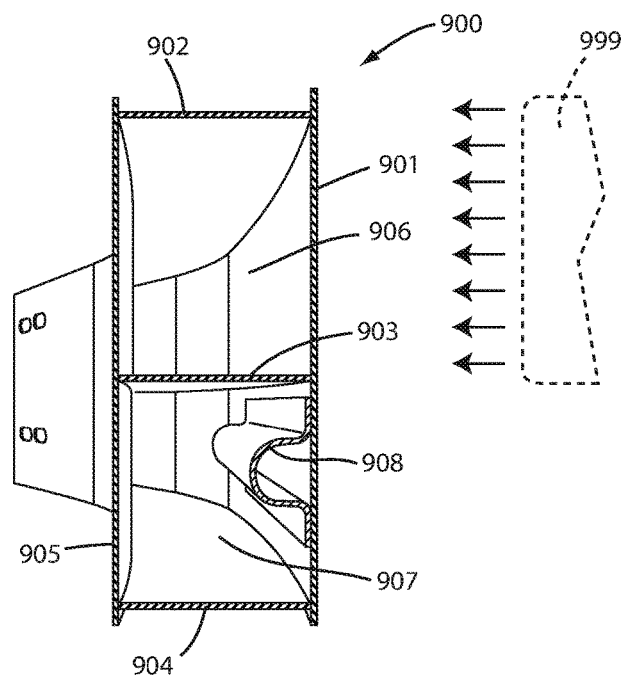

FIGS. 51-52 are perspective end views of a swept double-tube bumper reinforcement beam 900 formed by multiple sheets 901-905 to form adjacent tubes 906-907 (five sheets shown, though more or less could be used) sharing a common mid-level horizontal shear wall 903. The beam 900 includes a 12-18 inch hat-shaped internal reinforcement 908 welded in a centered position on an inside of the "flat" front wall 901 of the beam's lower tube 907. It is contemplated that the internal reinforcement 908 could be a same material and thickness and hardness as the front wall 901, or could be a different material, thickness or hardness, or any variation thereof. For example, where the sheets 901-905 are 1.6 mm steel with tensile strength of 220 ksi, the internal reinforcement 908 could be 2.2 mm steel with 80 ksi tensile strength. Part of the advantage of using the internal reinforcement 908 is that the beam 900 can be tailored to provide optimal resistance to buckling along its center area when impacted, while still minimizing weight by strategically limiting a location of the reinforcement beam 900 to only the area where the additional buckling resistance is needed. (Specifically, it is noted that buckling strength in bumper reinforcement beams is most near a center of an unsupported section of a beam, while buckling strength is not as necessary in locations near the vehicle frame mounts at ends of the beam.)

Part of the advantage of the internal reinforcement 908 is that the overall weight of the beam 900 can be minimized by optimally selecting thin-walled sheets making up the walls 901-905. It is noted that very high strength materials allow the use of thinner walls, thus saving weight. However, our testing has shown that bumper beams made from thin-walled sheets (e.g. 1.6 mm or less) and using very-high-tensile-strength materials (e.g. 190 ksi tensile strength or more) can have a tendency to catastrophically and prematurely collapse (herein called "thin walled catastrophic failure from impact"). In thin walled catastrophic failure from impact, the thin wall loads up and then prematurely fails well ahead of the predicted theoretical failure load. The results are that the actual failure of an impacted beam occurs at impact energies far below the theoretical predicted impact energy, which is not a good thing. The addition of the internal reinforcement 908 helps reduce this premature failure of the thin-walled front wall of the beam. It is noted that the internal reinforcement (908) can be used on one or both tubes. The illustrated internal reinforcement 908 was only used on one of the tubes (such as the bottom tube as illustrated due to offset impactor location 999 as illustrated in FIG. 52), thus further saving weight and yet it was found to provide adequate resistance to buckling on impact.

Figure 53:
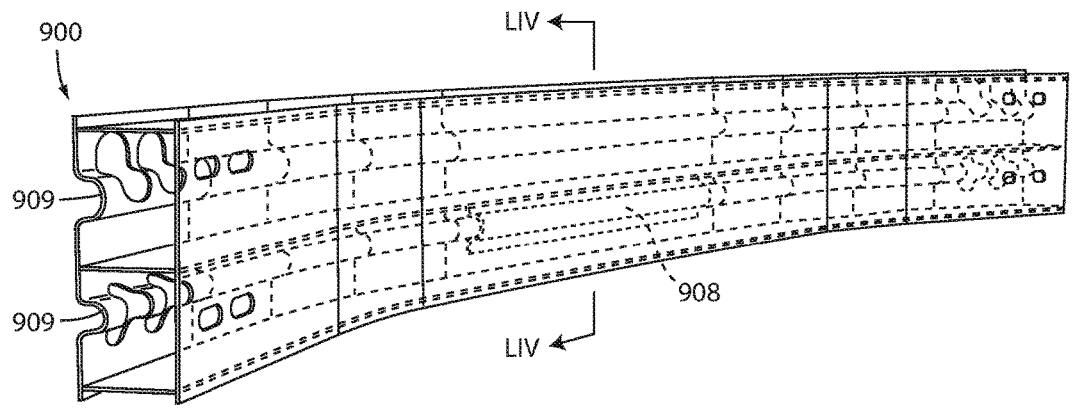
FIGS. 53-54 are perspective end views of a swept double-tube beam with an internal reinforcement similar to FIGS. 51-52 but where the front wall includes stiffening channel ribs.
Figure 54:
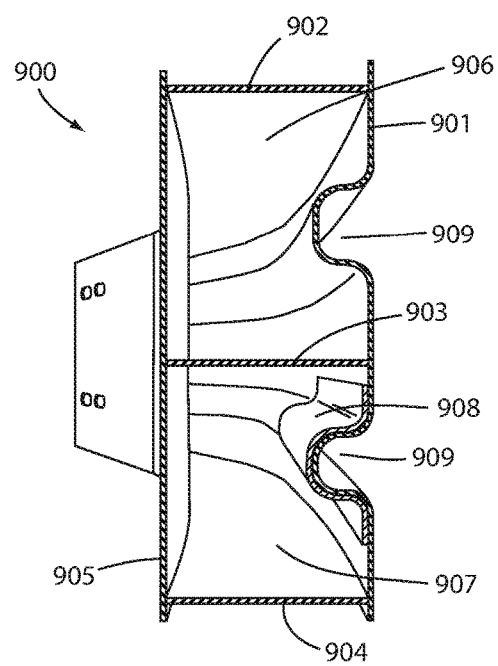

FIGS. 53-54 are perspective end views of a swept double-tube beam with an internal reinforcement similar to FIGS. 51-52 but where the front wall 901 includes stiffening channel ribs 909 over each of the tubes 906 and 907. In FIG. 53, the internal reinforcement 908 is placed "on" the lower stiffening channel rib 909, thus adding to its strength. It is noted that in some circumstances, the beam in FIG. 51 can be designed with lower total weight than the beam in FIG. 53 because the existence of the channel rib(s) 909 adds considerably to the overall amount of sheet material necessary to form the beam. By eliminating the channel rib(s) 909 and adding only a short internal reinforcement 908, the total beam weight can be reduced, by up to 5%.

Figure 55:
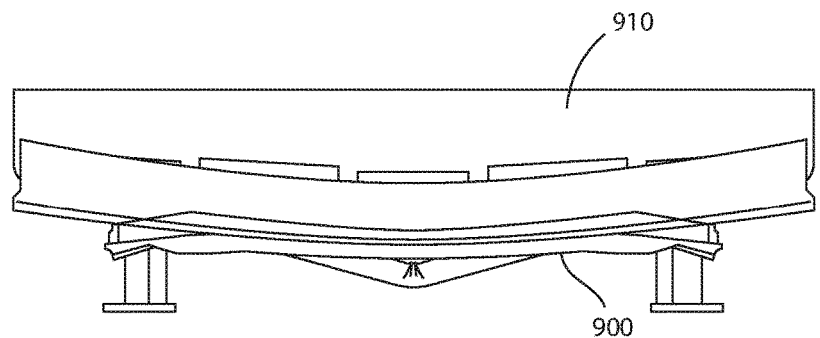
FIG. 55 is a top view of an impacted beam with buckle-type failure.
Figure 56:
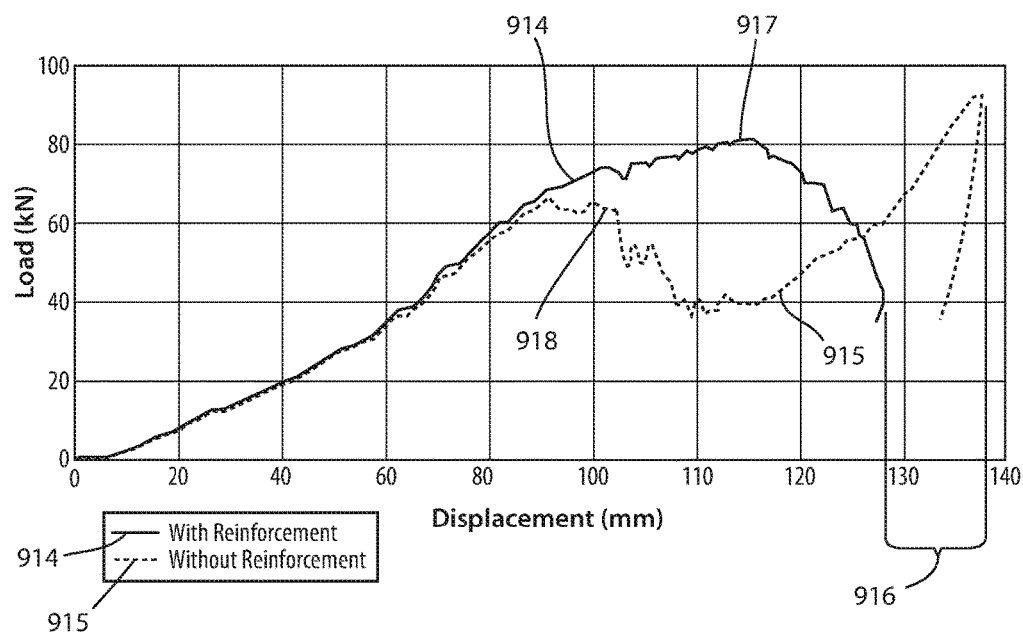
FIG. 56 is a chart showing energy absorption by the beam of FIG. 51 compared to a beam without internal reinforcement.
Figure 57:
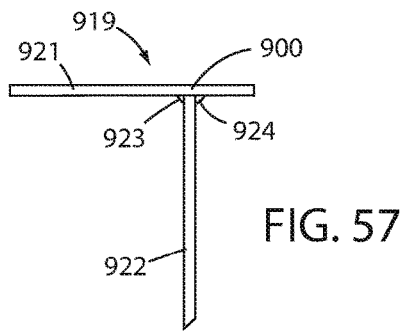
FIG. 57 is a cross section of a beam with welded non-radiused corners, and having localized annealing of welds at the non-radiused corners.
Figure 58:
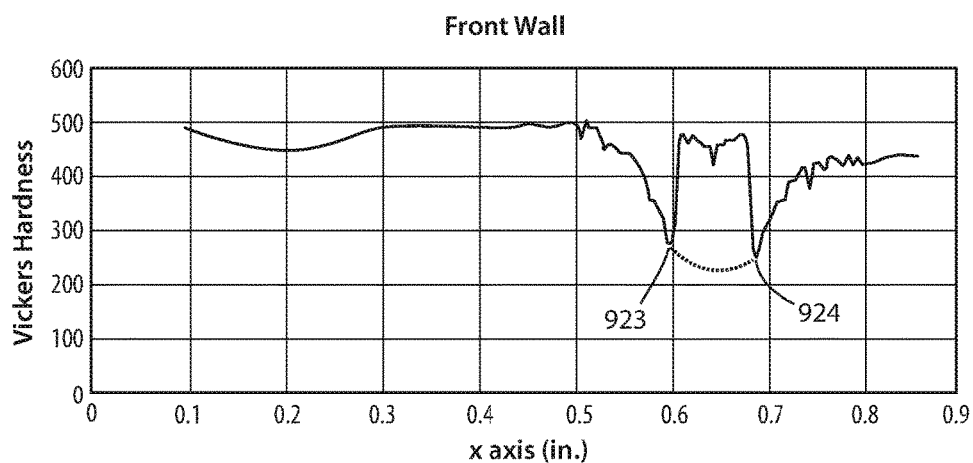
FIGS. 58-59 are charts relating to FIG. 57.
Figure 59:
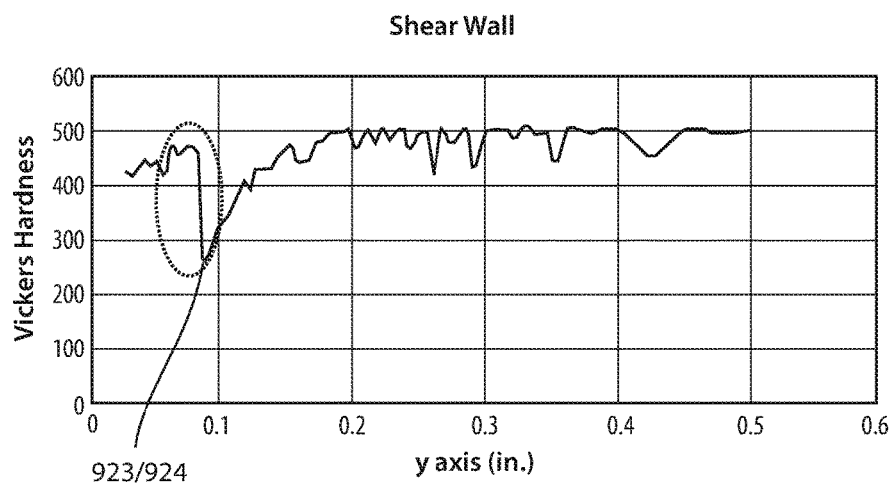

FIG. 55 is a top view of an impacted beam (similar to beam 900) with buckle-type failure. FIG. 56 is a chart showing load deflection curves for similar beams. The chart includes a first line 914 showing energy absorption by the beam 900 (with one internal reinforcement 908) of FIG. 51 compared to a beam without internal reinforcement (referred to as a "no-internal-reinforcement beam" herein) (line 915). Notice that with the internal reinforcement 909, the buckle is prevented and energy is absorbed with less displacement, as shown by the gap 916 identified on the chart. Specifically, the beam 900 with internal reinforcement 908 continues to rise in resistance to load up until about 130 mm displacement. Contrastingly, the line 915 falls off sooner, such as about 100 mm displacement, due to earlier buckling of the no-internal-reinforcement beam.

Figure 60:
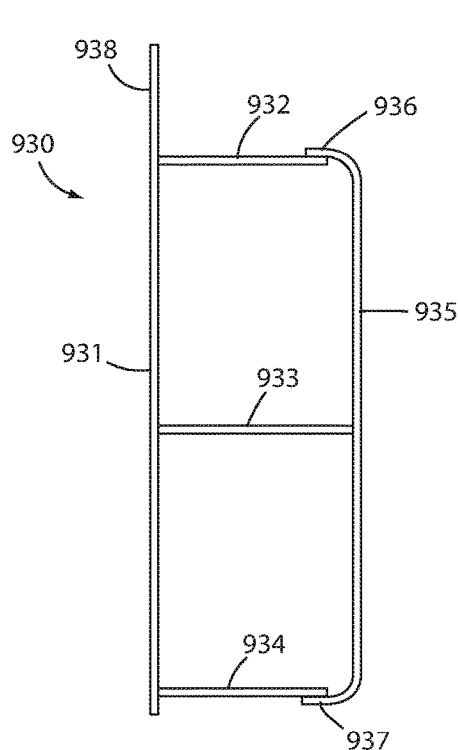
FIGS. 60-61 are cross sections of two similar double-tube beams, where the beam includes a vertically-flat front wall, a (horizontal) mid-level shear wall, and one or more sheets forming top, rear and bottom walls.

FIG. 60 illustrates a double-tube beam 930 having a vertical front wall 931 made by a single sheet; top, mid, and bottom horizontal shear walls 932, 933, 934 made by single sheets; and a rear wall 935 made by a single sheet. Top and bottom edge sections 936 and 937 of the rear wall 935 are bent with a radius so that they overlap onto the top and bottom shear walls 932, 934 respectively. The front wall 931 includes an upper edge section 938 that extends well above the upper tube, thus forming a lip that can be used to support fascia, or for other mounting purpose on the beam.

Figure 61:
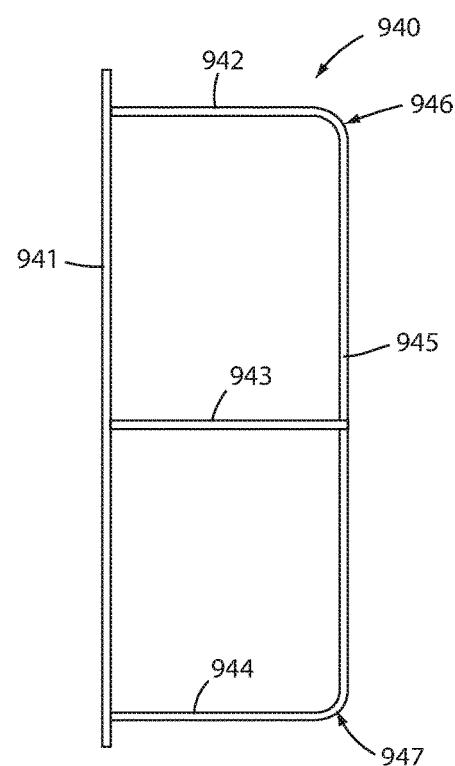

FIG. 61 is a cross section of a double-tube beam 940 similar to double-tube beam 930. The beams 940 has a front wall 941; upper, mid, and lower shear walls 942-944, and a rear wall 945. However, an upper L-shaped component 946 has legs forming the top wall 942 and an upper part of the rear wall 945. Also, a lower L-shaped component 947 has legs forming the top wall 944 and a lower part of the rear wall 945. It is noted that the components of beam 940 facilitate welding during assembly of the beam 940.

Figure 62:
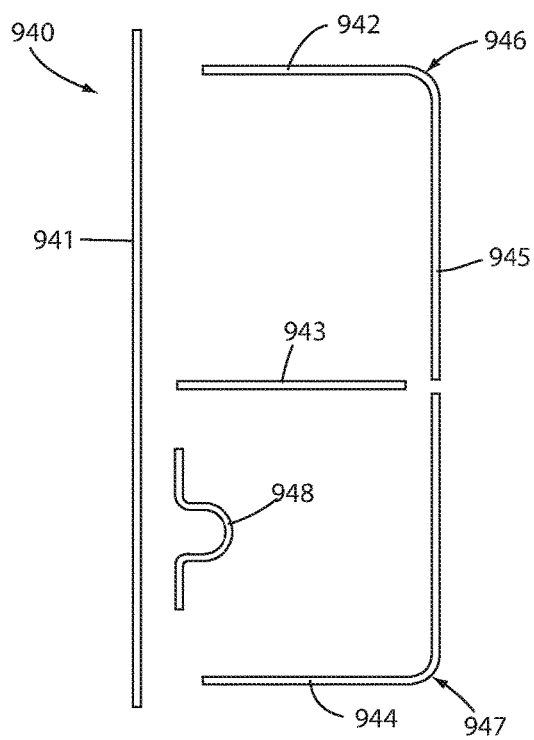
FIG. 62 is an exploded cross section of a double-tube beam, the beam including a vertical "flat" front wall (which may be longitudinally swept or linear) and including a horizontal mid-level shear wall, and including (upper and lower) L-shaped walls that form the rear and top (or rear and bottom) walls of the beam, the figures also showing an optional internal reinforcement.
Figure 63:
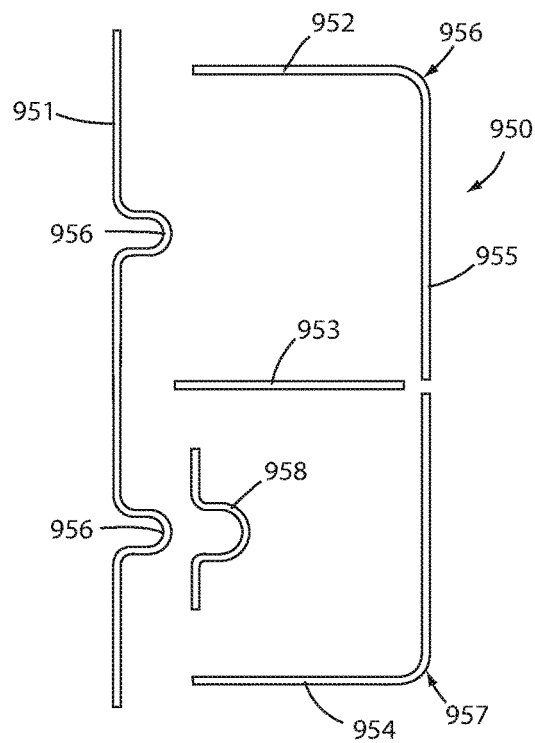
FIG. 63 is an exploded cross section similar to FIG. 62, but with the front wall including channel ribs across the two tubes, the figures also showing an optional internal reinforcement.

FIG. 62 shows a beam 940, but shows addition of an internal reinforcement 948 (previously described as reinforcement 908). FIG. 63 illustrates a beam 950 with walls 951-955 similar to beam 940 with walls 941-945, but where the front wall 951 includes two channel ribs 956. The internal reinforcement 958 is welded internally to the front wall near a center section of the beam 950 for providing added buckling strength in the selected center section. The reinforcement 958 does not extend a full length of the beam 950, but instead only extends a short distance as required by a particular bumper beam functional requirements, such as only 12 to 20 inches or so.

Thus, it is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A reinforcement beam article comprising:
    a plurality of at least three separate pre-formed sheets secured together with weld material to form a tubular box beam with front and rear vertical walls and multiple horizontal walls defining upper and lower tubes, an edge of some of the sheets abutting a side surface of an adjacent one of the sheets to define front and rear non-radiused corners when cross sectioned transversely to a length of the beam; and
    an internal reinforcement secured to an inside of the front wall in at least one of the upper and lower tubes, the internal reinforcement extending less than a total length of the beam.

2. The article of claim 1, wherein the internal reinforcement has a hat-shaped cross section.

3. A reinforcement beam article comprising:
    a plurality of at least three separate pre-formed sheets secured together with weld material to form a tubular box beam with front and rear vertical walls and multiple horizontal walls defining upper and lower tubes, an edge of some of the sheets abutting a side surface of an adjacent one of the sheets to define front and rear non-radiused corners when cross sectioned transversely to a length of the beam; and
    wherein the weld material is annealed in a localized region of the beam.

4. The article of claim 3, wherein the localized region is defined as portion of a cross section of the beam, the portion not extending a full circumference of the cross section of the beam.

5. The article of claim 3, wherein the localized region is defined as part of a longitudinal section of the beam, the longitudinal section not extending a full length of the beam.

6. A reinforcement beam article comprising:
    a plurality of at least three separate pre-formed sheets secured together with weld material to form a tubular box beam with front and rear vertical walls and multiple horizontal walls defining upper and lower tubes, an edge of some of the sheets abutting a side surface of an adjacent one of the sheets to define front and rear non-radiused corners when cross sectioned transversely to a length of the beam; and
    wherein the beam has a non-linear length.

7. The article of claim 6, wherein the preformed sheets include at least one of beam-access openings, holes, channel ribs, and an internal reinforcement.

8. A reinforcement beam article comprising:
    a plurality of at least three separate pre-formed sheets secured together with weld material to form a tubular box beam with front and rear vertical walls and multiple horizontal walls defining upper and lower tubes, an edge of some of the sheets abutting a side surface of an adjacent one of the sheets to define front and rear non-radiused corners when cross sectioned transversely to a length of the beam; and wherein the beam has a non-constant cross section along the beam's length.

9. A reinforcement beam article comprising:

a plurality of at least three separate pre-formed sheets secured together with weld material to form a tubular box beam with front and rear vertical walls and multiple horizontal walls defining upper and lower tubes, an edge of some of the sheets abutting a side surface of an adjacent one of the sheets to define front and rear non-radiused corners when cross sectioned transversely to a length of the beam; and wherein at least one of the sheets does not extend a full length of the beam.

10. A reinforcement beam article comprising:

a plurality of at least three separate sheets secured together with weld material to form a tubular box beam with front and rear vertical walls and multiple horizontal walls defining at least one tube, an edge of some of the sheets abutting a side surface of an adjacent one of the sheets to define front and rear non-radiused corners when cross sectioned transversely to a length of the beam, and an internal reinforcement attached to an inside center portion of the front wall, the internal reinforcement not extending to ends of the beam.

11. The article of claim 10, wherein the internal reinforcement extends between 12 to 24 inches in length.

12. The article of claim 10, wherein the internal reinforcement has a hat-shaped cross section.

13. The article of claim 10, wherein the weld material is annealed in a localized region of the beam.

14. The article of claim 10, wherein the at least one tube includes two adjacent tubes separated by a common wall.

15. The article of claim 10, wherein at least one of the sheets does not extend a full length of the beam.

* * * * *